US012676699B2

(12) United States Patent  
Shental et al.

(10) Patent No.: US 12,676,699 B2  
(45) Date of Patent: Jul. 7, 2026

(54) METHODS AND APPARATUS TO FACILITATE DISTRIBUTION MATCHING VIA REVERSED COMPRESSION

(71) Applicant: QUALCOMM Incorporated, San Diego, CA (US)

(72) Inventors: Ori Shental, Marlboro, NJ (US); Thomas Joseph Richardson, South Orange, NJ (US); Liangming Wu, Beijing (CN); Kexin Xiao, Shanghai (CN); Ashwin Sampath, Skillman, NJ (US); Muhammad Nazmul Islam, Littleton, MA (US); Michael Dimare, Morristown, NJ (US); Michael Ethan Berkowitz, New York, NY (US); Changlong Xu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 18/279,593

(22) PCT Filed: Apr. 16, 2021

(86) PCT No.: PCT/CN2021/087705  
§ 371 (c)(1),  
(2) Date: Aug. 30, 2023

(87) PCT Pub. No.: WO2022/217576  
PCT Pub. Date: Oct. 20, 2022

(65) Prior Publication Data  
US 2024/0146449 A1 May 2, 2024

(51) Int. Cl.  
*H03M 7/00* (2006.01)  
*H04L 1/00* (2006.01)  
*H04W 28/04* (2009.01)

(52) U.S. Cl.  
CPC .......... *H04L 1/0042* (2013.01); *H04W 28/04* (2013.01)

(58) Field of Classification Search  
CPC .... H03M 7/30; H03M 13/05; H03M 13/1117; H03M 13/112; H03M 13/1134;  
(Continued)

(56) References Cited

U.S. PATENT DOCUMENTS 6,535,642 B1 * 3/2003 De Bonet ............... G06T 9/005  
382/232  
7,095,343 B2 * 8/2006 Xie ......................... H03M 7/30  
341/107  
(Continued)

FOREIGN PATENT DOCUMENTS

EP 3352401 A1 7/2018  
WO 2019197043 A1 10/2019

OTHER PUBLICATIONS

Fehenberger T., et al., "Multiset-Partition Distribution Matching", Aug. 9, 2018 (Aug. 9, 2018), XP055530362, DOI: 10.1109/TCOMM. 2018.2881091, Retrieved from the Internet: URL: https://arxiv.org/pdf/1801.08445.pdf [retrieved on Dec. 5, 2018], Sections I-III, figure 1, 9 pages.  
(Continued)

*Primary Examiner* — Linh V Nguyen  
(74) *Attorney, Agent, or Firm* — Procopio, Cory, Hargreaves & Savitch LLP

(57) ABSTRACT

Apparatus, methods, and computer-readable media for facilitating distribution matching via reversed compression are disclosed herein. An example method for wireless communication at a wireless transmitter includes decompressing a first sequence of information bits for wireless transmission to output a sequence of shaped symbols. The example method also includes compressing the sequence of shaped symbols to output a second sequence of compressed infor-  
(Continued)

mation bits. The example method also includes transmitting, to a receiver, a signal comprising the sequence of shaped symbols.

30 Claims, 12 Drawing Sheets

(58) Field of Classification Search
CPC ......... H03M 13/1137; H03M 13/1171; H03M 13/1515; H03M 13/152; H03M 13/23; H03M 13/258; H03M 13/2703; H03M 13/2707; H03M 13/2936; H03M 13/2957; H03M 13/353; H03M 13/356; H03M 13/3761; H03M 13/47; H03M 13/618; H03M 13/6393; H03M 13/658; H03M 13/6583; H03M 13/6588; H03M 13/6591; H03M 5/20; H03M 7/3059; H03M 7/3082; H03M 7/3084; H03M 7/3086; H03M 7/40; H03M 7/4031; H03M 7/6005; H03M 7/6047
USPC ......................... 341/51, 60, 106, 107, 65, 67
See application file for complete search history.

(56) References Cited

U.S. PATENT DOCUMENTS

| | | | | |
|---|---|---|---|---|
| 7,340,664 | B2 * | 3/2008 | Shen | H03M 13/2957 |
| | | | | 714/755 |
| 7,472,335 | B1 * | 12/2008 | Cameron | H03M 13/258 |
| | | | | 714/790 |
| 9,088,888 | B2 * | 7/2015 | Duan | H04W 12/02 |
| 2008/0225819 | A1 * | 9/2008 | Niu | H04N 21/43637 |
| | | | | 370/342 |
| 2008/0282129 | A1 * | 11/2008 | Blanksby | H03M 13/1117 |
| | | | | 714/E11.032 |
| 2011/0251986 | A1 * | 10/2011 | Potkonjak | H03M 7/30 |
| | | | | 706/21 |
| 2012/0257117 | A1 * | 10/2012 | Freundlich | H04N 21/4363 |
| | | | | 348/E5.093 |
| 2013/0238865 | A1 * | 9/2013 | Kataoka | H03M 7/4031 |
| | | | | 711/154 |
| 2021/0294525 | A1 * | 9/2021 | Sumiyoshi | G06F 3/0604 |
| 2022/0014300 | A1 * | 1/2022 | Torbatian | H04B 10/516 |
| 2023/0299788 | A1 * | 9/2023 | Agustsson | G06N 3/045 |
| | | | | 341/94 |

OTHER PUBLICATIONS

International Search Report and Written Opinion—PCT/CN2021/ 087705—ISA/EPO—Sep. 24, 2021.
Pikus M., et al., "Finite-Precision Implementation of Arithmetic Coding Based Distribution Matchers", 2019, IEEE Global Communications Conference (GLOBECOM), IEEE, Dec. 9, 2019 (Dec. 9, 2019), 6 pages, XP033722488, DOI: 10.1109/GLOBECOM38437. 2019.9013800, [retrieved on Feb. 25, 2020], Sections I-III.

* cited by examiner

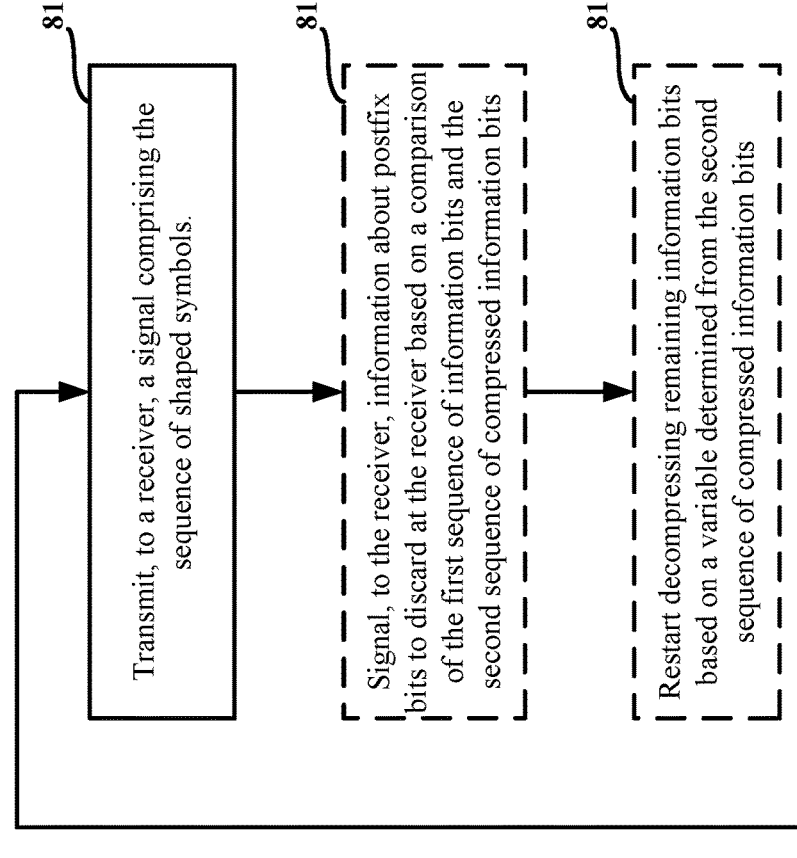

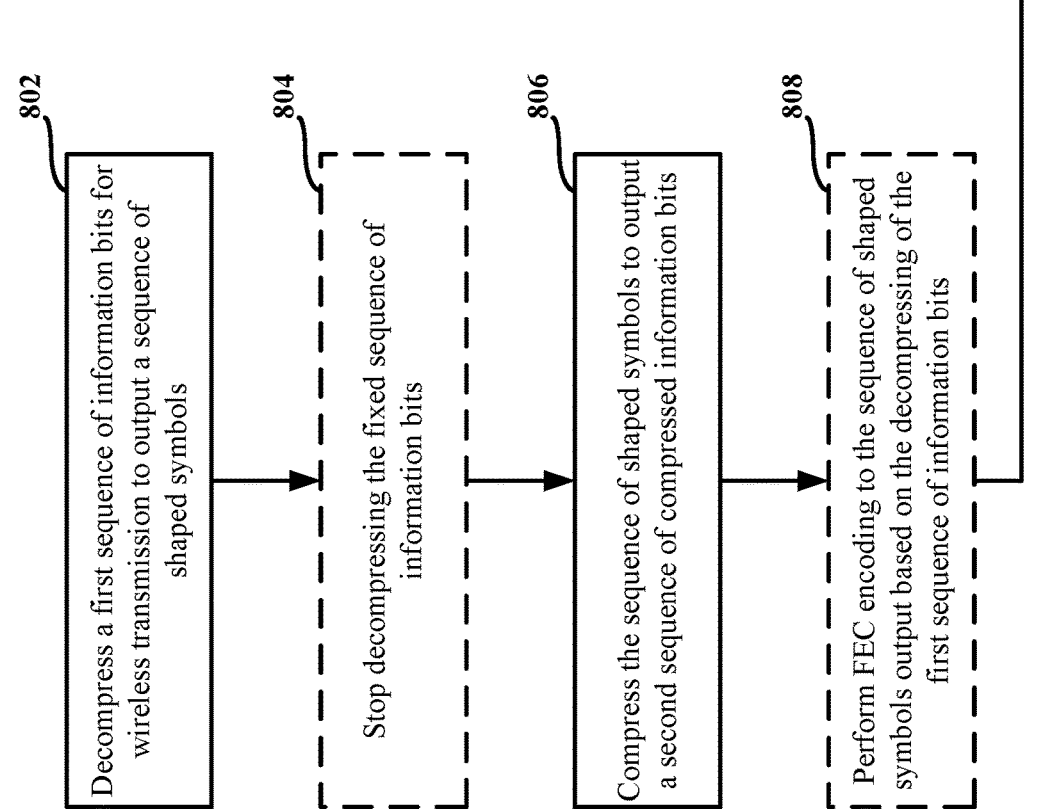

800

810 Transmit, to a receiver, a signal comprising the sequence of shaped symbols.

812 Signal, to the receiver, information about postfix bits to discard at the receiver based on a comparison of the first sequence of information bits and the second sequence of compressed information bits 814 Restart decompressing remaining information bits based on a variable determined from the second sequence of compressed information bits 802 Decompress a first sequence of information bits for wireless transmission to output a sequence of shaped symbols 804 Stop decompressing the fixed sequence of information bits 806 Compress the sequence of shaped symbols to output a second sequence of compressed information bits 808 Perform FEC encoding to the sequence of shaped symbols output based on the decompressing of the first sequence of information bits

FIG. 8

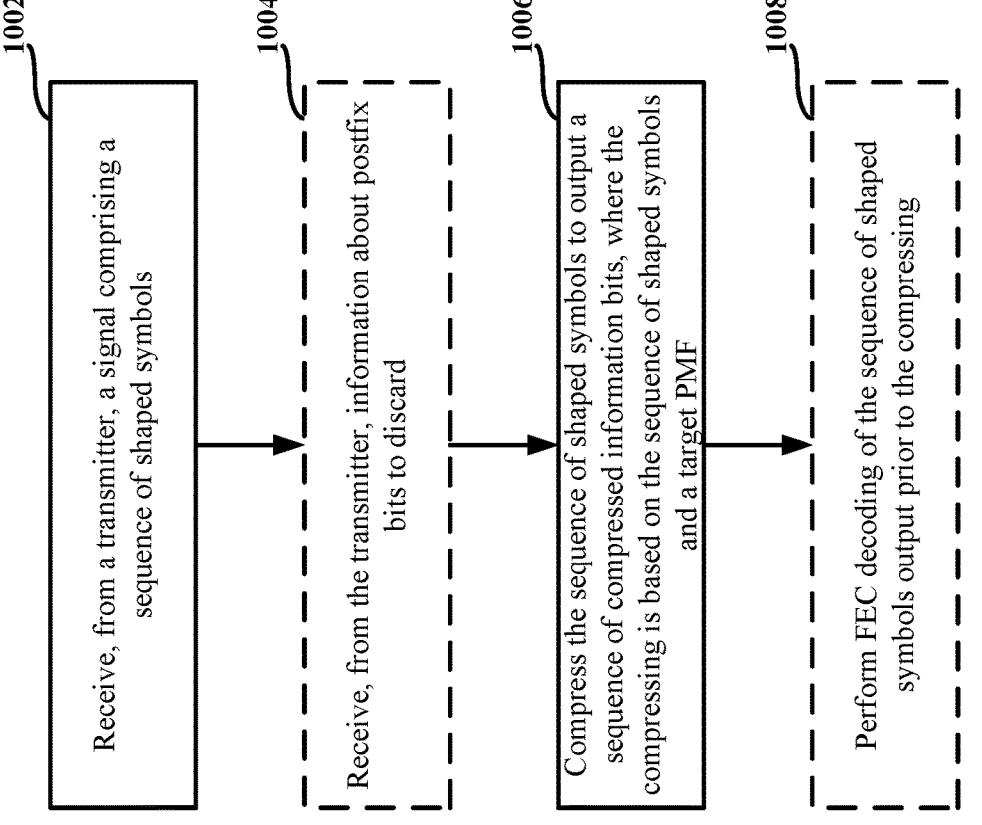

1002

Receive, from a transmitter, a signal comprising a sequence of shaped symbols

1004

Receive, from the transmitter, information about postfix bits to discard

1006

Compress the sequence of shaped symbols to output a sequence of compressed information bits, where the compressing is based on the sequence of shaped symbols and a target PMF

1008

Perform FEC decoding of the sequence of shaped symbols output prior to the compressing

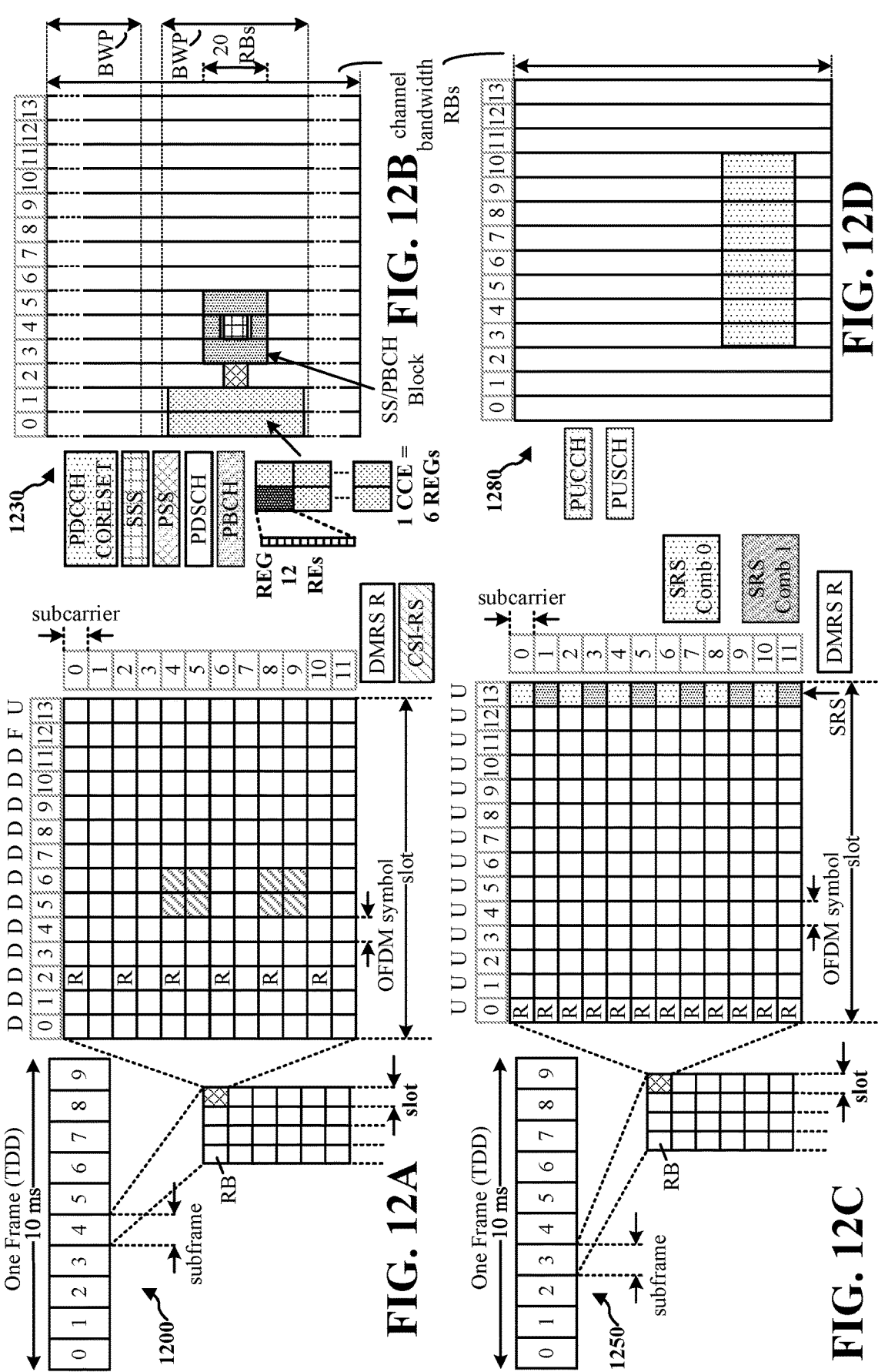

METHODS AND APPARATUS TO FACILITATE DISTRIBUTION MATCHING VIA REVERSED COMPRESSION

CROSS REFERENCE TO RELATED APPLICATION(S)

This application is a National Stage Application filed under 35 U.S.C. § 371 of PCT International Application No. PCT/CN2021/087705, entitled "METHODS AND APPARATUS TO FACILITATE DISTRIBUTION MATCHING VIA REVERSED COMPRESSION" and filed Apr. 16, 2021, which is expressly incorporated by reference herein in its entirety.

BACKGROUND

Technical Field

The present disclosure relates generally to communication systems, and more particularly, to transmissions over a noisy channel.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a wireless transmitter. An example apparatus includes memory and at least one processor coupled to the memory. The memory and the at least one processor are configured to decompress a first sequence of information bits for wireless transmission to output a sequence of shaped symbols. The memory and the at least one processor are further configured to compress the sequence of shaped symbols to output a second sequence of compressed information bits. Additionally, the memory and the at least one processor are configured to transmit, to a receiver, a signal comprising the sequence of shaped symbols.

In another aspect of the disclosure, a method, a computer-readable medium, and an apparatus are provided for wireless communication at a wireless receiver. An example apparatus includes memory and at least one processor coupled to the memory. The memory and the at least one processor are configured to receive, from a transmitter, a signal comprising a sequence of shaped symbols. The memory and the at least one processor are further configured to compress the sequence of shaped symbols to output a sequence of compressed information bits, wherein the compression is based on the sequence of shaped symbols and a target probability mass function (PMF).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a flowchart of a method of wireless communication at a wireless transmitter, in accordance with the teachings disclosed herein.

FIG. 10 is a flowchart of a method of wireless communication at a wireless receiver, in accordance with the teachings disclosed herein.

FIG. 12A is a diagram illustrating an example of a first frame, in accordance with various aspects of the present disclosure.

FIG. 12B is a diagram illustrating an example of DL channels within a subframe, in accordance with various aspects of the present disclosure.

FIG. 12C is a diagram illustrating an example of a second frame, in accordance with various aspects of the present disclosure.

FIG. 12D is a diagram illustrating an example of UL channels within a subframe, in accordance with various aspects of the present disclosure.

DETAILED DESCRIPTION

Figure 1:
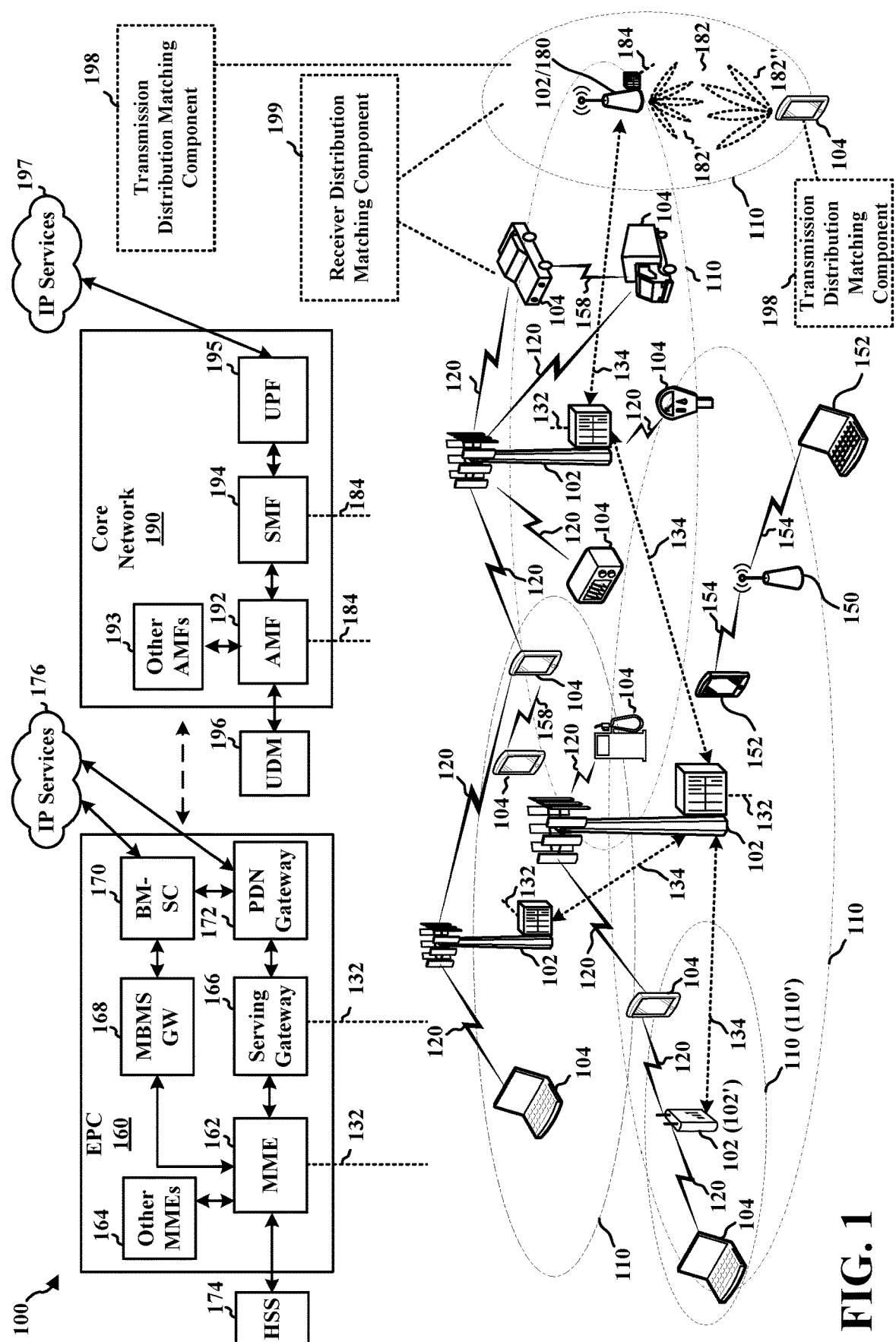
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Communication over a channel is possible if the transmission rate over the channel satisfies a capacity based on the transmission power and the signal-to-noise ratio (SNR). The Shannon Capacity models the amount of information that can be transmitted across a noise communication channel in which certain signal values can be confused with each other. The Shannon Capacity in an additive white Gaussian noise (AWGN) channel is achievable with a Gaussian distribution of the information. For example, uniform signaling (e.g., a non-Gaussian distribution of information) may optimistically achieve an achievable information rate (AIR) that is 1.53 dB (0.255 bits per dimension (bit/1-D)) away from the capacity of the AWGN channel (sometimes referred to as the "shaping gap").

Techniques for reducing (or closing) the shaping gap include generating a non-uniform distribution of the information. For example, in geometric shaping, instead of using a uniform distribution, an equiprobable signal may be constructed with constellation points arranged with a Gaussianlike geometry. Geometric shaping enables large shaping gains for symbol-wise forward error correction (FEC). However, geometric shaping may provide limited Gray mapping and/or may be difficult to achieve shaping gains in bit-interleaved coded modulation (BICM) with binary FEC.

Another technique for reducing the shaping gap includes probabilistic shaping. In probabilistic shaping, instead of using a uniform distribution, aspects induce a Gaussian-like signal distribution with a uniform constellation. Examples of probabilistic shaping including Trellis shaping and shell mapping. Probabilistic amplitude shaping is another technique for employing probabilistic shaping that has achieved high throughput for commercial use in optical core networks (e.g., over 10 GB/second). Probabilistic shaping offers low-complexity and flexible integration with existing BICM schemes.

Aspects disclosed herein provide techniques for improving the spectral efficiency and achievable information rate for communication over a channel, such as an AWGN channel. For example, disclosed techniques utilize a distribution matcher that includes a decompresser to convert a sequence of information bits into a set of symbols. The sequence of information bits may be uniformly distributed, such as in 5G NR. However, aspects presented herein are not limited to application with 5G NR. The decompresser may generate the sequence of symbols based on a target probability mass function (PMF), such as a Maxwell-Boltzmann Distribution, and a symbol block length. The sequence of symbols may be transmitted to a receiver for processing to determine the transmitted information.

The distribution matcher may also include a compressor to convert the set of symbols into a sequence of compressed information bits. In a fixed-to-fixed scheme, the distribution matcher may include a comparator to compare the sequence of information bits to the sequence of compressed information bits to determine how many bits were not converted into the set of symbols. In some examples, the distribution matcher may provide the output of the comparator to the receiver so that the receiver can determine how to process the set of symbols. For example, based on a compressor at the receiver, the receiver may compress the set of symbols to generate information bits based on the target PMF, which may result in extra bits. The receiver may use the output of the comparator (e.g., discard signaling) to determine how many bits to discard.

In another aspect, the distribution matcher may employ a variable-to-fixed scheme in which the decompressor is configured with a "back-off" limit. The back-off limit may limit the amount of information bits that the decompressor may convert to the set of symbols so that extra bits are not transmitted to the receiver for discarding. Moreover, the variable-to-fixed scheme may limit the amount of overhead (e.g., compared to the fixed-to-fixed scheme) as a comparator is not needed and, thus, the distribution matcher may forego transmitting discard signaling.

FIG. 1 is a diagram illustrating an example of a wireless communications system and an access network 100 including base stations 102 or 180 and UEs 104.

As an example, a wireless transmitter, such as a base station 102/180 and/or a UE 104, may include a transmission distribution matching component 198. In certain aspects, the transmission distribution matching component 198 may be configured to decompress a first sequence of information bits for wireless transmission to output a sequence of shaped symbols. The example transmission distribution matching component 198 may also be configured to compress the sequence of shaped symbols to output a second sequence of compressed information bits. Additionally, the example transmission distribution matching component 198 may be configured to transmit, to a receiver, a signal comprising the sequence of shaped symbols.

Still referring to FIG. 1, in certain aspects, a wireless receiver, such as a base station 102/180 and/or a UE 104, may include a receiver distribution matching component 199. In certain aspects, the receiver distribution matching component 199 may be configured to receive, from a transmitter, a signal comprising a sequence of shaped symbols. The example receiver distribution matching component 199 may also be configured to compress the sequence of shaped symbols to output a sequence of compressed information bits, and where the compression is based on the sequence of shaped symbols and a target probability mass function (PMF).

Although the following description may be focused on 5G NR, the concepts described herein may be applicable to other similar areas, such as LTE, LTE-A, CDMA, GSM, and other communication technologies, such as optical communication, in which signaling may occur over a noisy channel.

The wireless communications system (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., a macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
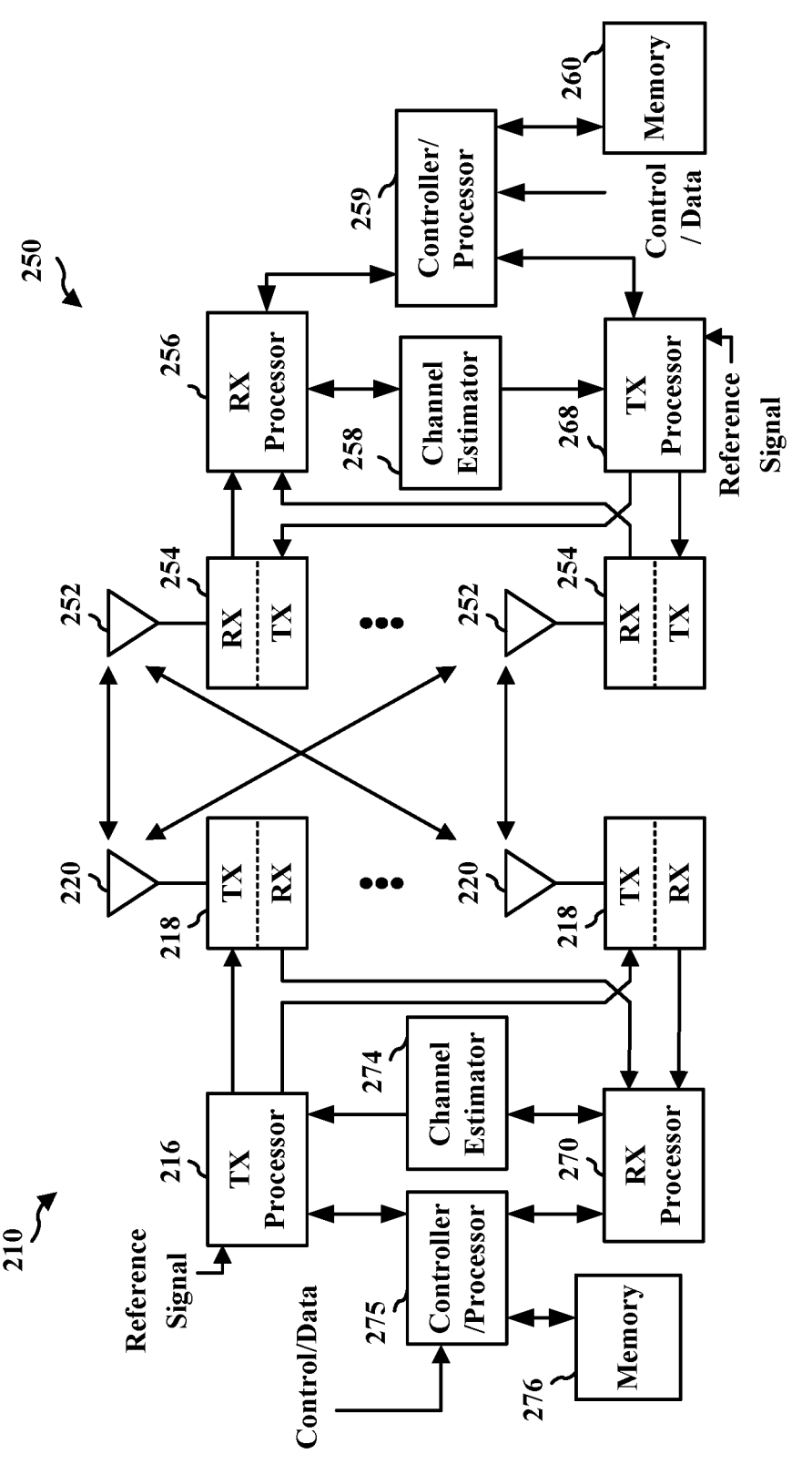
FIG. 2 is a diagram illustrating an example of a base station and user equipment (UE) in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor (e.g., a TX processor 216) and the receive (RX) processor (e.g., an RX processor 270) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218 TX. Each transmitter 218 TX may modulate an RF carrier with a respective spatial stream for transmission.

At the UE 250, each receiver 254 RX receives a signal through its respective antenna 252. Each receiver 254 RX recovers information modulated onto an RF carrier and provides the information to an RX processor 256. A TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by a channel estimator 258. The soft decisions are then decoded and deinterleaved to recover the data and control signals that were originally transmitted by the base station 210 on the physical channel. The data and control signals are then provided to a controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254 TX. Each transmitter 254 TX may modulate an RF carrier with a respective spatial stream for transmission.

The UL transmission is processed at the base station 210 in a manner similar to that described in connection with the receiver function at the UE 250. Each receiver 218 RX receives a signal through its respective antenna 220. Each receiver 218 RX recovers information modulated onto an RF carrier and provides the information to the RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

Aspects of the transmission distribution matching component 198 may be performed by the UE 250 (e.g., by at least one of the TX processor 268, the RX processor 256, and the controller/processor 259) and/or base station 210 (e.g., by at least one of the TX processor 216, the RX processor 270, and the controller/processor 275).

Aspects of the receiver distribution matching component 199 may be performed by the UE 250 (e.g., by at least one of the TX processor 268, the RX processor 256, and the controller/processor 259) and/or the base station 210 (e.g., by at least one of the TX processor 216, the RX processor 270, and the controller/processor 275).

Communication over a channel is possible if the transmission rate over the channel satisfies a capacity based on the transmission power and the signal-to-noise ratio (SNR). The Shannon Capacity models the amount of information that can be transmitted across a noise communication channel in which certain signal values can be confused with each other. The Shannon Capacity in an additive white Gaussian noise (AWGN) channel is achievable with a Gaussian distribution of the information. For example, uniform signaling (e.g., a non-Gaussian distribution of information) may optimistically achieve an achievable information rate (AIR) that is 1.53 dB (0.255 bits per dimension (bit/1-D)) away from the capacity of the AWGN channel (sometimes referred to as the "shaping gap").

Techniques for reducing (or closing) the shaping gap include generating a non-uniform distribution of the information. For example, in geometric shaping, instead of using a uniform distribution, an equiprobable signal is constructed with constellation points arranged with a Gaussian-like geometry. Geometric shaping enables large shaping gains for symbol-wise forward error correction (FEC). However, geometric shaping may provide limited Gray mapping and/ or may be difficult to achieve shaping gains in bit-interleaved coded modulation (BICM) with binary FEC.

Another technique for reducing the shaping gap includes probabilistic shaping. In probabilistic shaping, instead of using a uniform distribution, aspects induce a Gaussian-like signal distribution with a uniform constellation. Examples of probabilistic shaping including Trellis shaping and shell mapping. Probabilistic amplitude shaping is another technique for employing probabilistic shaping that has achieved high throughput for commercial use in optical core networks (e.g., over 10 GB/second). Probabilistic shaping offers low-complexity and flexible integration with existing BICM schemes.

Figure 3:
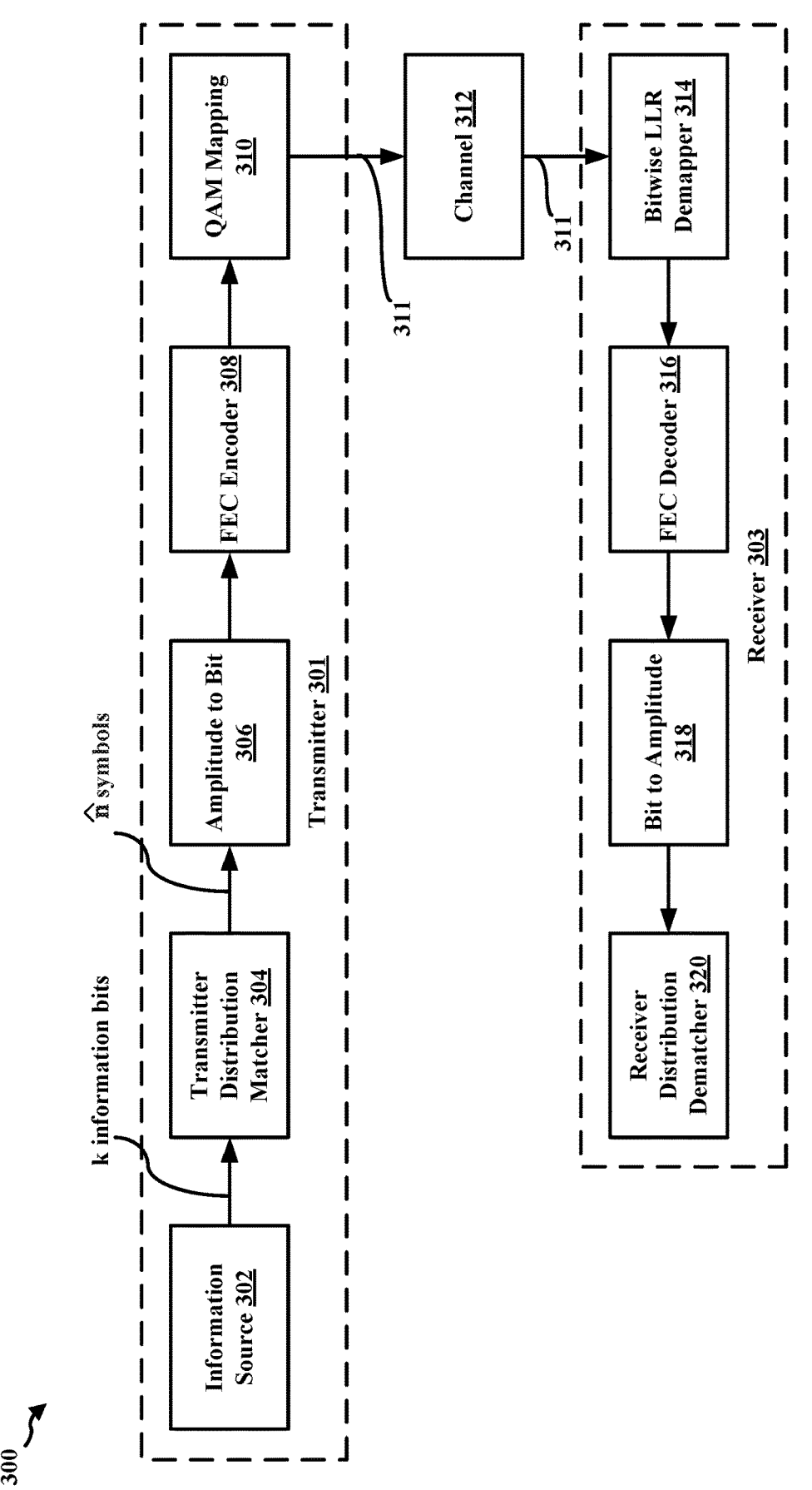
FIG. 3 illustrates a communication system employing probabilistic amplitude shaping, in accordance with the teachings disclosed herein.

Probabilistic amplitude shaping (PAS) utilizes reverse concatenation whereby the shaping precedes FEC coding. FIG. 3 illustrates a communication system 300 employing PAS, as presented herein. The communication system 300 includes a wireless transmitter 301 and a wireless receiver 303. For example, an information source 302 may generate k information bits that is received by a transmitter distribution matcher 304. The transmitter distribution matcher 304 may generate a sequence of symbols (n). The sequence of symbols (n) may be received by an amplitude to bit component 306 and an FEC encoder 308 to produce a set of bits where some are shaped and others are uniformly distributed. After the encoding, the bits are mapped, e.g., to quadrature amplitude modulation (QAM) symbols by a QAM mapping component 310. A signal 311 (e.g., the symbols) is then transmitted over the wireless medium to the wireless receiver 303, e.g., over a channel 312.

At the wireless receiver 303, the signal 311 is received by a bitwise log-likelihood ratios (LLR) demapper component 314 to demap the symbols of the signal 311. The demapped symbols are received by the FEC decoder 316 and a bit to amplitude component 318 to decode the bits. The decoded bits are provided to a receiver distribution dematcher 320 to uniformly distribute the received bits, which may then be sent to their destination.

Aspects disclosed herein provide techniques for improving the spectral efficiency and achievable information rate for communication over an AWGN channel. For example, disclosed techniques utilize a distribution matcher that includes a decompresser to convert a sequence of information bits (u) into a set of symbols. The sequence of information bits (u) may be uniformly distributed. As one non-limiting example, in 5G NR, the sequence of information bits may be uniformly distributed. The decompresser may generate the sequence of symbols based on a target probability mass function (PMF), such as a Maxwell-Boltzmann Distribution, and a symbol block length (n). The sequence of symbols may be transmitted to a receiver for processing to determine the transmitted information.

The distribution matcher may also include a compressor to convert the set of symbols into a sequence of compressed information bits (û). In a fixed-to-fixed scheme, the distribution matcher may include a comparator to compare the sequence of information bits (u) to the sequence of compressed information bits (û) to determine how many information bits were not converted into the set of symbols. In some examples, the distribution matcher may provide the output of the comparator to the receiver so that the receiver can determine how to process the set of symbols. For example, based on a compressor at the receiver, the receiver may compress the set of symbols to generate information bits based on the target PMF, which may result in extra bits. The receiver may use the output of the comparator (e.g., discard signaling) to determine how many bits to discard.

In another aspect, the distribution matcher may employ a variable-to-fixed scheme in which the decompresser is configured with a "back-off" limit. The back-off limit may limit the amount of information bits that the decompressor may convert to the set of symbols so that extra bits are not transmitted to the receiver for discarding. Moreover, the variable-to-fixed scheme may limit the amount of overhead (e.g., compared to the fixed-to-fixed scheme) as a comparator is not needed and, thus, the distribution matcher may forego transmitting discard signaling with information about the number of bits to discard at the receiver. In such examples, when employing the variable-to-fixed scheme, the rate loss compared to target entropy may be improved compared to when employing the fixed-to-fixed scheme.

Figure 4:
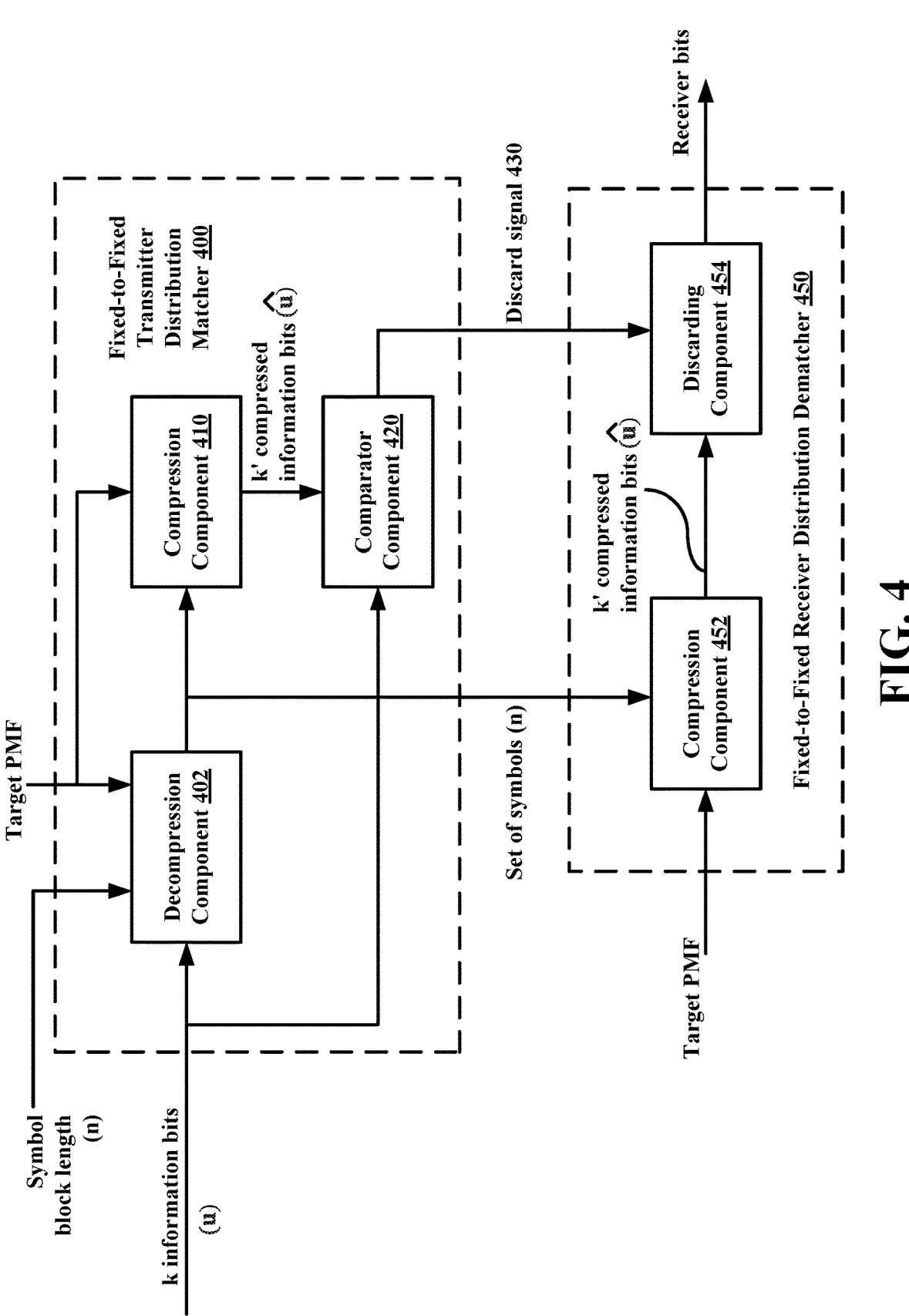
FIG. 4 illustrates a block diagram of an example fixed-to-fixed transmitter distribution matcher and a fixed-to-fixed receiver distribution dematcher, in accordance with the teachings disclosed herein.

FIG. 4 illustrates a block diagram of an example fixed-to-fixed transmitter distribution matcher 400 and a fixed-to-fixed receiver distribution dematcher 450, as presented herein. The example fixed-to-fixed transmitter distribution matcher 400 employs reversed back-to-back compression and decompression. For example, the example fixed-to-fixed transmitter distribution matcher 400 includes a decompression component 402, a compression component 410, and a comparator component 420. The decompression component 402 receives a sequence (u) of k information bits (e.g. from the information source 302 of FIG. 3) and generates a set of symbols (n). For example, the decompression component 402 may generate the set of symbols (n) based on a target PMF (e.g., such as the Maxwell-Boltzmann Distribution) and a symbol block length (n). The set of symbols (n) may represent shaped real positive amplitude symbols. The set of symbols (n) may then be transmitted to a receiver, for example, over a channel.

As shown in FIG. 4, the set of symbols (n) are also provided to the compression component 410, which applies the target PMF to generate a sequence (û) of k' compressed information bits. The comparator component 420 receives the sequence (u) of k information bits and the sequence (û) of k' compressed information bits to generate a discard signal 430. The discard signal 430 provides information about postfix bits (e.g., the last bits or last segment of bits in the sequence) and may be based on a difference in the quantity of bits of the sequence (û) and the sequence (u). For example, the decompression component 402 may receive a sequence (u) of 100 information bits. Based on the symbol block length and the target PMF, the decompression component 402 may generate the set of symbols (n) using 80 bits. The compression component 410 may receive the set of symbols (n) and generate the sequence (û) of 80 compressed information bits. The comparator component 420 may then compare the sequence (u) of 100 information bits and the sequence (û) of 80 compressed information bits and determine that 20 bits were not used. Thus, the discard signal 430 may indicate that 20 bits were not used.

Thus, the fixed-to-fixed transmitter distribution matcher 400 may attempt to determine whether an n-length sequence of symbols distributed according to the target PMF can be compressed to the given information bit sequence (u) of at least length k. If the answer is yes, then it may be appreciated that the quantity of the first k information bits of the sequence (u) is less than or equal to quantity of the first k' compressed information bits of the sequence (û) and are identical. Moreover, the first k' compressed information bits of the sequence (û) may be part of a prefix code. As a result, the discard signal 430 may indicate to discard zero bits. As used herein, a prefix code may comprise a type of code system for which a "prefix property" holds. In some such systems, two code words may not share a prefix (e.g., an initial segment of bits). Additionally, or alternatively, in some such systems, a whole code word in the system may not comprise a prefix (e.g., an initial segment of bits) of another code word in the system.

However, if the answer is no (e.g., an n-length sequence of symbols distributed according to the target PMF cannot be compressed to the given information bit sequence (u) of at least length k), then it may be appreciated that the discard signal 430 may indicate to discard one or more bits. For example, only a portion of the first k information bits of the sequence (u) and the k' compressed information bits of the sequence (û) may be the same. For example, the quantity of the portion of bits that are the same may be determined by Equation 1 (below).

$$\text{Identical bits} = \min(k, k') - \text{discard} \qquad \text{Equation 1:}$$

In Equation 1, the variable "k" represents the quantity of information bits of the sequence (u), the variable "k'" represents the quantity of compressed information bits of the sequence (û), and the variable "discard" represents the difference in the respective quantities. Thus, based on Equation 1, the identical bits may be determined based on the minimum of the quantity of information bits of the sequence (u) and the quantity of compressed information bits of the sequence (û) less the difference in the respective quantities. Moreover, it may be appreciated that the sequence (u) and the sequence (û) are not the same starting at the bit ($\min(k, k') - \text{discard} + 1$).

In the illustrated example of FIG. 4, the fixed-to-fixed receiver distribution dematcher 450 includes a compression component 452 and a discarding component 454. The example compression component 452 receives the set of symbols (n) and generates the sequence (û) of k' compressed information bits based on the target PMF. Aspects of the compression component 452 may be similar to the compression component 410 of the fixed-to-fixed transmitter distribution matcher 400. That is, the sequence (û) of k' compressed information bits generated by the compression components 410, 452 may be the same. The example discarding component 454 receives the sequence (û) of k' compressed information bits from the compression component 452 and the discard signal 430 from the fixed-to-fixed transmitter distribution matcher 400 and determines which, if any, bits to discard.

As shown in FIG. 4, transmitting the set of symbols (n) may include overhead. For example, if an n-length sequence of symbols distributed according to the target PMF cannot be compressed to the given information bit sequence (u) of at least length k, then the set of symbols (n) may include additional bits that the receiver discards. Additionally, the transmitter transmits the discard signal 430. In some examples, the discard signal 430 may be of length "dec2bin (discard)", which converts the decimal value of the sequence of bits to discard into a binary value. Thus, the total value of bits that may be conveyed by the transmitter to the receiver may be determined by Equation 2 (below).

$$\hat{k} = \min(k, k') - \text{discard} - \text{length}(dec2bin(\text{discard})) \qquad \text{Equation 2:}$$

In Equation 2, the variable "$\hat{k}$" represents the total value of bits conveyed by the transmitter, the variable "k" represents the quantity of information bits of the sequence (u), the variable "k'" represents the quantity of compressed information bits of the sequence (û), the variable "discard" represents the difference in the respective quantities, and the variable "length(dec2bin(discard))" represents the decimal-to-binary value of the discarded bits.

Figure 5:
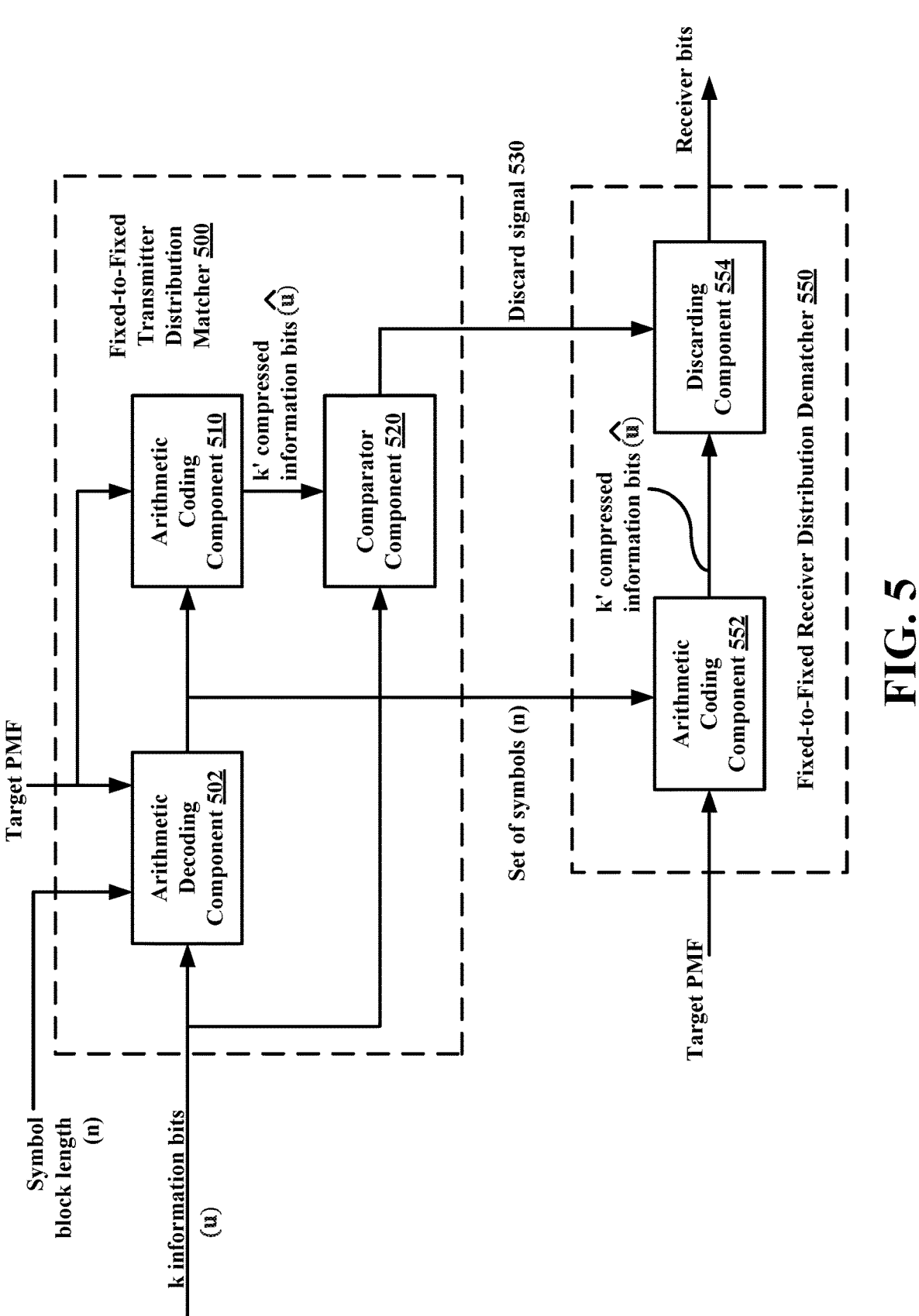
FIG. 5 illustrates a block diagram of an example implementation of a fixed-to-fixed transmitter distribution matcher and an example implementation of a fixed-to-fixed receiver distribution dematcher, in accordance with the teachings disclosed herein.

FIG. 5 illustrates a block diagram of an example implementation of a fixed-to-fixed transmitter distribution matcher 500 and an example implementation of a fixed-tofixed receiver distribution dematcher 550, as presented herein. The example fixed-to-fixed transmitter distribution matcher 500 employs reversed back-to-back compression and decompression. As shown in FIG. 5, the decompression component 402 of FIG. 4 may be implemented by an arithmetic decoding component 502, the compression component 410 of FIG. 4 may be implemented by an arithmetic coding component 510, and the compression component 452 of FIG. 4 may be implemented by an arithmetic coding component 552. Aspects of the comparator component 520 may be implemented by the comparator component 420 of FIG. 4. Aspects of the discard signal 530 may be implemented by the discard signal 430 of FIG. 4. Aspects of the discarding component 554 may be implemented by the discarding component 454 of FIG. 4.

The example arithmetic decoding component 502 and the arithmetic coding components 510, 552 may perform entropy decoding/encoding. Applying entropy decoding/encoding may improve compression ratios, which may allow more bits to be converted into symbols and, thus, allow an n-length sequence of symbols distributed according to the target PMF to be compressed to the given information bit sequence (u) of at least length k.

However, it may be appreciated that other examples may employ other techniques for coding. For example, the fixed-to-fixed transmitter distribution matcher and the fixed-to-fixed receiver distribution matcher may employ Huffman coding, range coding, or universal coding.

As described above, the fixed-to-fixed distribution matcher may transmit additional bits (e.g., overhead) that are discarded by the receiver. Thus, it may be beneficial to enable the decompression component to "back off" or terminate early the decompression procedure on a sequence (u) of k information bits. That is, if the decompression component receives the sequence (u) of 100 information bits, but the decompression component generates the set of symbols (n) based on the first 80 information bits, then the decompression component may stop processing the remaining 20 information bits. Thus, the quantity of discarded bits is reduced to zero as the set of symbols (n) includes those bits that were used. Moreover, a discard signal is not generated as the signal received by the receiver does not include bits to discard.

For example, and with respect to arithmetic coding, for the arithmetic coding to be a prefix code and to be recoverable (e.g., uniquely decodable) from a length-n symbol sequence (s), Equation 3 (below) may apply.

$$k = \left\lceil \log_2 \frac{1}{P(S)} \right\rceil + 1 \qquad \text{Equation 3}$$

In Equation 3, the variable "k" represents the quantity of bits, the variable "s" represents the sequence of length-n symbols, and the variable "P(S)" represents a probability of the sequence S of length-n symbols. For example, arithmetic coding takes n symbols and compresses them to k bits for which Equation 3 applies. However, when decompressing a random bit sequence, Equation 3 may not apply. Equation 4 (below) provides a techniques for averaging that may be beneficial when applying arithmetic coding.

$$H(s) \le E[k] =$$
$$\sum P(s) \left[ \left\lceil \log_2 \frac{1}{P(s)} \right\rceil + 1 \right] < \sum P(s) \left[ \log_2 \frac{1}{P(s)} + 2 \right] = H(s) + 2 \qquad \text{Equation 4}$$

In Equation 4, the variable "H(s)" represents the entropy of the sequence of length-n symbols, the variable "E[k]" represents the expectation applied to the k bits (e.g., an average with respect to the probability P(S)), and the variable "P(S)" represents the probability of the sequence S of length-n symbols. Based on Equation 4, it may be appreciated that it may be possible to bound the average rate, in bits per symbol, of the arithmetic coding, as shown in Equation 5 (below).

$$H(s) \le \frac{E[k]}{n} < H(s) + \frac{2}{n} < H(s) + 2 \qquad \text{Equation 5}$$

In Equation 5, the variable "H(s)" represents the entropy of the sequence of length-n symbols, the variable "E[k]" represents the expectation applied to the k bits (e.g., an average with respect to the probability P(S)), and the variable "n" represents the length of the symbols. On average, and as n increases, the maximum possible bits per symbol compression is H(s)+2. Thus, given an input of a random bit sequence of length k, if the decompression component (e.g., the arithmetic decoding component 502 of FIG. 5) stops decoding after n̂ symbols, then the conveyed quantity of bits (k̂) may be greater than the k bits of Equation 3. The value of n̂ symbols may be determined by applying Equation 6 (below). The conveyed quantity of bits (k̂) may be determined by applying Equation 7 (below).

$$\hat{n} = \left\lfloor \frac{k}{H(s) + 2} \right\rfloor \qquad \text{Equation 6}$$

In Equation 6, the variable "n̂" represents the quantity of symbols at which to stop the decompression procedure, the variable "k" represents the quantity of information bits, and the variable "H(s)" represents the entropy of the sequence of length-n symbols.

$$\hat{k} \ge \left\lceil \log_2 \frac{1}{P(\hat{s})} \right\rceil + 1 \qquad \text{Equation 7}$$

In Equation 7, the variable "k̂" represents the quantity of conveyed bits, and the variable "P(ŝ)" represents the probability of the sequence (ŝ) of length-n̂ symbols.

Thus, by "backing off" or stopping the decompression procedure after n̂ symbols (and so the sequence ŝ of length-n̂ symbols is less than or equal to the sequence s of length-n symbols), then a codeword of length k̂ may be uniquely decodable from the n̂≤n symbols.

Figure 6:
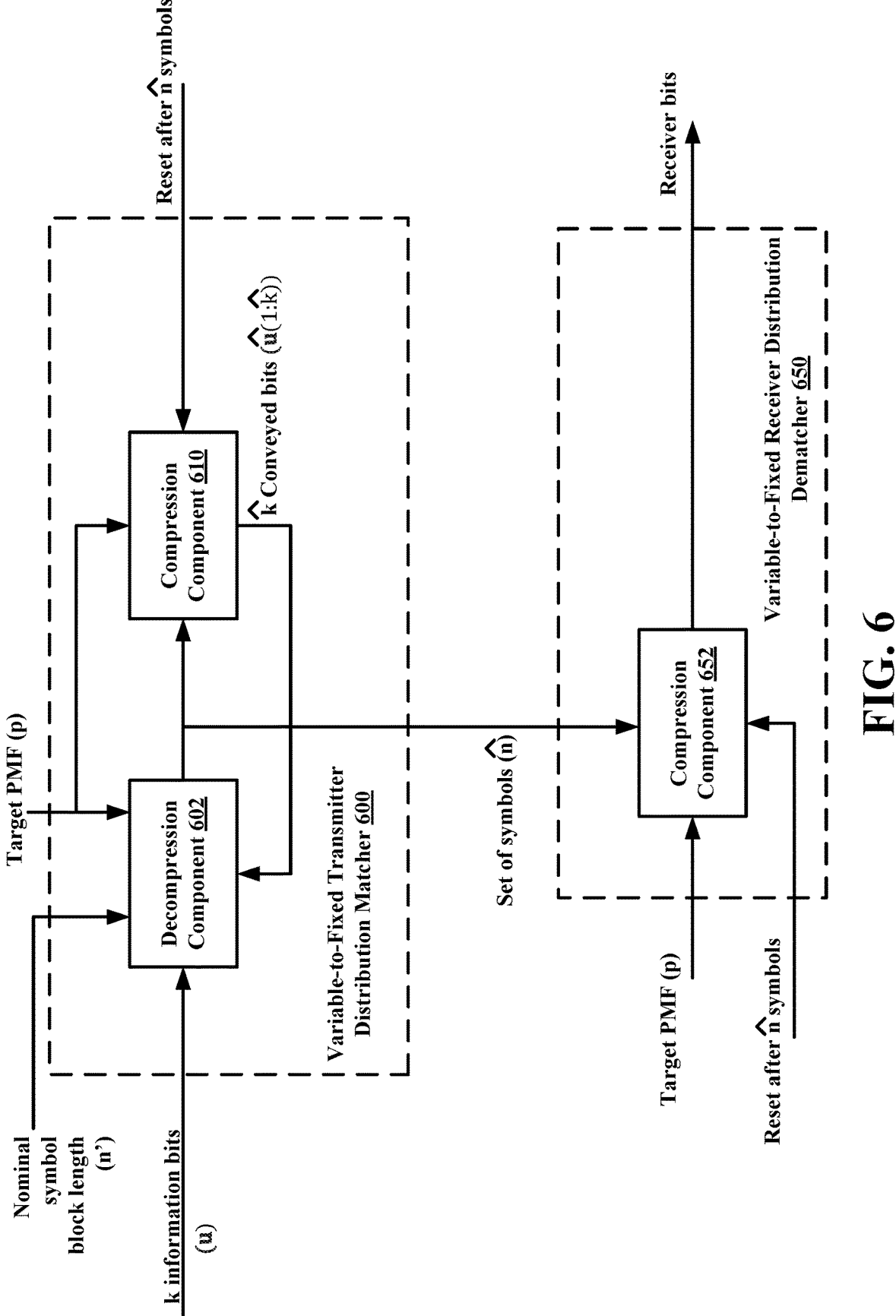
FIG. 6 illustrates a block diagram of an example variable-to-fixed transmitter distribution matcher and an example variable-to-fixed receiver distribution dematcher, in accordance with the teachings disclosed herein

FIG. 6 illustrates a block diagram of an example variable-to-fixed transmitter distribution matcher 600 and an example variable-to-fixed receiver distribution dematcher 650, as presented herein. Similar to the example fixed-to-fixed transmitter distribution matcher 400 of FIG. 4, the example variable-to-fixed transmitter distribution matcher 600 employs reversed back-to-back compression and decompression. In the illustrated example, aspects of the variable-to-fixed transmitter distribution matcher 600 and the variable-to-fixed receiver distribution dematcher 650 may be implemented using arithmetic coding techniques, such as an arithmetic coding component and an arithmetic decoding component.

As shown in FIG. 6, the variable-to-fixed transmitter distribution matcher 600 includes a decompression component 602 and a compression component 610. The decompression component 602 receives a sequence (u) of k information bits (e.g. from the information source 302 of FIG. 3) and generates a set of symbols (n̂). For example, the decompression component 602 may generate the set of symbols (n̂) based on a target PMF (p) (e.g., such as the Maxwell-Boltzmann Distribution) and a nominal symbol block length (n'). The set of symbols (n̂) may represent fixed shaped real positive amplitude symbols. The set of symbols (n̂) may then be transmitted to a receiver, for example, over a channel.

In the illustrated example of FIG. 6, the decompression component 602 stops the decompression procedure after the set of symbols (n̂) are generated. To determine the quantity of symbols (n̂) to generate, the decompression component 602 applies Equation 8 (below).

$$\hat{n} = \lfloor k/L \rfloor \qquad \text{Equation 8:}$$

In Equation 8, the variable "n̂" represents the quantity of symbols at which to stop the decompression procedure, the variable "k" represents the quantity of information bits, and the variable "L" corresponds to an entropy under a target PMF (p). The value of L may be determined by applying Equation 9 (below).

$$L = H_p + 2 \qquad \text{Equation 9:}$$

In Equation 9, the variable "$H_p$" represents the entropy of the target PMF (p). Thus, as shown in Equation 9, the value of L may be calculated as the sum of an integer and the entropy $H_p$. In the example of Equation 9, the integer is two. However, in some examples, the value of L may be determined by applying Equation 10 (below).

$$L = \lceil H_p \rceil + 1 \qquad \text{Equation 10:}$$

In Equation 10, the variable "$H_p$" represents the entropy of the target PMF (p). Thus, as shown in Equation 10, the value of L may be calculated as the sum of an integer and the ceiling function of the entropy $H_p$. In the example of Equation 10, the integer is one.

By applying Equation 8, the quantity of symbols of the set of symbols (n̂) is less than the quantity of symbols of the set of symbols (n) of FIG. 4. Additionally, the quantity of conveyed bits k is less than the k information bits. Thus, additional (e.g., bits to discard at the receiver) are not transmitted.

As an example, the decompression component 602 may receive a sequence (u) of 100 information bits and the value of L may be 4. By applying Equation 8, the decompression component 602 may stop the decompression procedure at 25 symbols (e.g., 100 bits/4=25 symbols). The transmitter may then transmit the 25 symbols.

As described above, the decompression component 602 may stop the decompression procedure after generating the set of symbols (n̂). That is, instead of processing the full sequence (u) of k information bits, the decompression component 602 may stop after k̂ bits, and where k̂ is less than the k information bits. For example, in the above example, the decompression component 602 may use 80 bits of the 100 information bits to generate the 25 symbols.

As shown in FIG. 6, the set of symbols (n̂) are also provided to the compression component 610. The compression component 610 may receive the set of symbols (n̂) and generate the sequence (û) of k̂ conveyed bits. Thus, the compression component 610 may enable the variable-to-fixed transmitter distribution matcher 600 to determine which bits of the sequence (u) of k information bits were converted to symbols. For example, in the above example, the compression component 610 may determine that the 25 symbols conveyed to the receiver correspond to bits 1 to 80 of the sequence (u) of 100 information bits. In such examples, the decompression component 602 may the information regarding the sequence (û) of k̂ conveyed bits to determine which bit to start the next decompression procedure. For example, the decompression component 602 may start the next decompression procedure on bits 81 to 100 of the sequence (u) of 100 information bits. Moreover, it may be appreciated that the set of symbols (n̂) generated by the next decompression procedure may be different than the previous set of symbols (n̂). For example, in the above example, the quantity of information bits to process for the next decompression procedure is 20 information bits and with the same value of L (e.g., four), the next decompression procedure may generate five symbols based on Equation 8 (e.g., 20 bits/4=5 symbols).

In the illustrated example of FIG. 6, the variable-to-fixed receiver distribution dematcher 650 includes a compression component 652. The example compression component 652 receives the set of symbols (n̂) and generates the sequence (û) of k̂ conveyed bits based on the target PMF (p). Aspects of the compression component 652 may be similar to the compression component 610 of the variable-to-fixed transmitter distribution matcher 600. That is, the sequence (û) of k̂ conveyed bits generated by the compression components 610, 652 may be the same.

As shown in FIG. 6, the set of symbols (n̂) may comprise a varying quantity of symbols. Moreover, the sequence (û) of k̂ conveyed bits may also be a varying quantity. To improve the compression procedure performed at the compression components 610, 652, the respective compression components 610, 652 reset arithmetic coding parameters after performing the compression procedure on n̂ symbols. For example, for the first compression procedure in the above example, the compression components 610, 652 may reset the arithmetic coding parameters after processing the 25 symbols, and for the second compression procedure, the compression components 610, 652 may reset the arithmetic coding parameters after processing the five symbols.

As described above, aspects of the decompression component 602 and the compression components 610, 652 may be implemented by arithmetic coding. Additionally, compared to the fixed-to-fixed distribution matching scheme of FIG. 4, the variable-to-fixed distribution matching scheme of FIG. 6 may reduce overhead by, for example, avoiding the transmitting of bits that are discarded and by skipping the transmitting of a discard signal. As a result, the variable-to-fixed distribution matching scheme of FIG. 6 may improve spectral efficiency, reduce rate loss due to shaping, and may improve the achievable information rate (e.g., improvement in gain) compared to the fixed-to-fixed distribution matching scheme.

Figure 7:
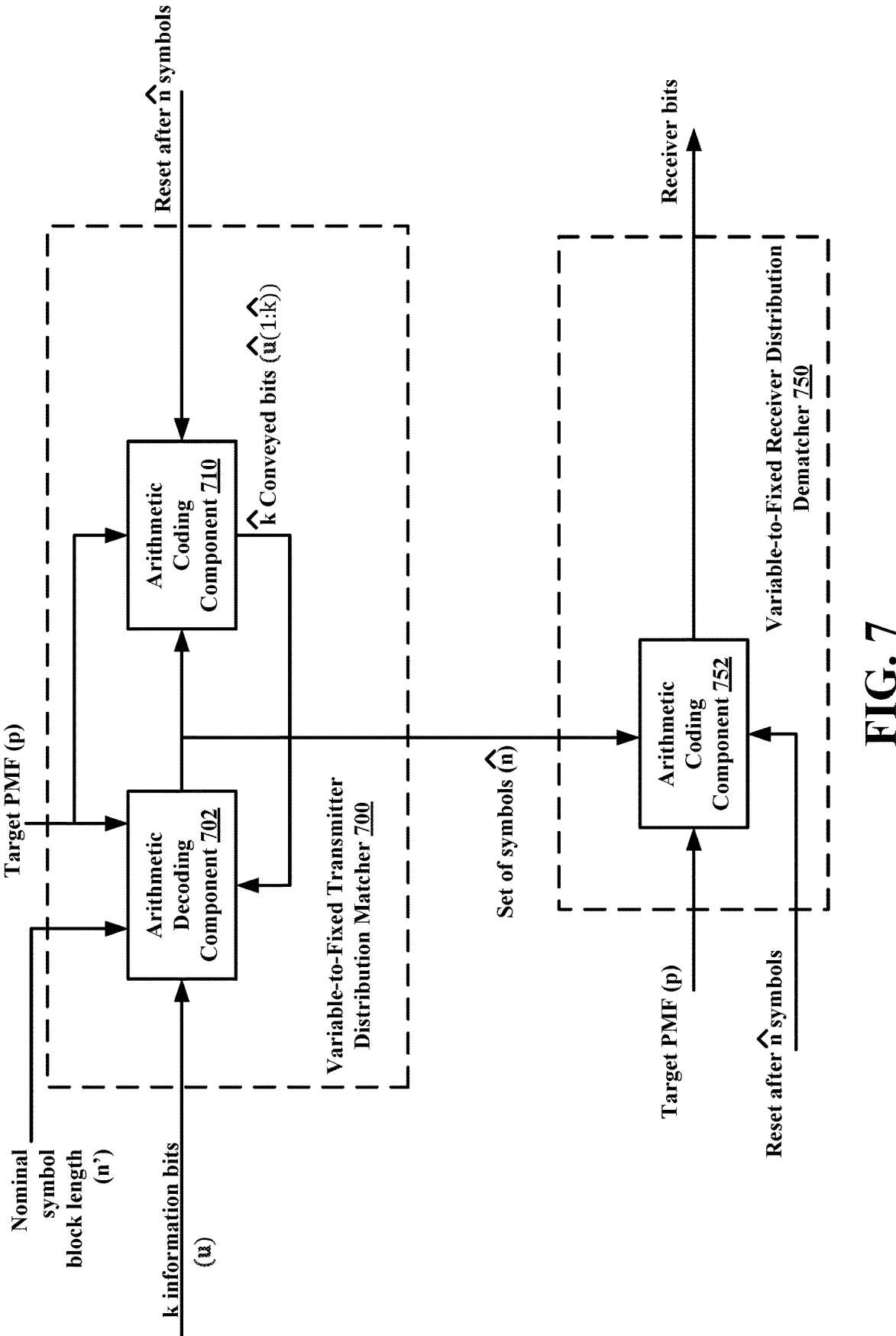
FIG. 7 illustrates a block diagram of an example implementation of a variable-to-fixed transmitter distribution matcher and an example implementation of a variable-to-fixed receiver distribution dematcher, in accordance with the teachings disclosed herein.

FIG. 7 illustrates a block diagram of an example implementation of a variable-to-fixed transmitter distribution matcher 700 and an example implementation of a variable-to-fixed receiver distribution dematcher 750, as presented herein. The variable-to-fixed transmitter distribution matcher 700 employs reversed back-to-back compression and decompression. As shown in FIG. 7, the decompression component 602 of FIG. 6 may be implemented by an arithmetic decoding component 702, the compression component 610 of FIG. 6 may be implemented by an arithmetic coding component 710, and the compression component 652 of FIG. 6 may be implemented by an arithmetic coding component 752.

The example arithmetic decoding component 702 and the arithmetic coding components 710, 752 may perform entropy decoding/encoding. Applying entropy decoding/encoding may improve compression ratios, which may allow more bits to be converted into symbols and, thus, allow an n'-length sequence of symbols distributed according to the target PMF to be compressed to the given information bit sequence (û) of k̂ conveyed bits.

However, it may be appreciated that other examples may employ other techniques for coding. For example, the variable-to-fixed transmitter distribution matcher and the variable-to-fixed receiver distribution matcher may employ Huffman coding, range coding, or universal coding.

FIG. 8 is a flowchart 800 of a method of wireless communication. The method may be performed by a wireless transmitter, such as a UE (e.g., the UE 104, the UE 250, and/or an apparatus 902 of FIG. 9) or a base station (e.g., the base station 102/180, the base station 210). Optional aspects are illustrated with a dashed line. The method may facilitate improving spectral efficiency by reducing rate loss due to shaping and improving the achievable information rate (e.g., improvement in gain) for communications in a noisy channel.

At 802, the wireless transmitter decompresses a first sequence of information bits for wireless transmission to output a sequence of, or a set of, shaped symbols, as described in connection with the set of symbols (n) of FIGS. 4 and/or 5, and/or the set of symbols (n̂) of FIGS. 6 and/or 7. For example, 802 may be performed by a decompression component 940 of the apparatus 902 of FIG. 9.

In some examples, the decompression may be based on a target symbol length and a target probability mass function (PMF).

In some examples, the decompression is based on arithmetic decoding, as described in connection with FIGS. 5 and/or 7. In some examples, the decompression is based on probabilistic decompression. In some examples, the decompression is based on one or more of Huffman coding, range coding, or universal coding. In some examples, the decompression of the first sequence of information bits is performed at a distribution matcher, such as the example fixed-to-fixed transmitter distribution matcher 400 of FIG. 4, the example fixed-to-fixed transmitter distribution matcher 500 of FIG. 5, the example variable-to-fixed transmitter distribution matcher 600 of FIG. 6, and/or the example variable-to-fixed transmitter distribution matcher 700 of FIG. 7.

At 806, the wireless transmitter compresses the sequence of shaped symbols to output a second sequence of compressed information bits, as described in connection with the sequence (û) of k' compressed information bits of FIGS. 4 and/or 5, and/or the sequence (û) of k̂ conveyed bits of FIGS. 6 and/or 7. For example, 806 may be performed by a compression component 942 of the apparatus 902 of FIG. 9.

In some examples, the compression may be based on the target PMF.

In some examples, the compression is based on arithmetic coding, as described in connection with FIGS. 5 and/or 7. In some examples, the compression is based on probabilistic compression.

At 810, the wireless transmitter transmits, to a receiver, a signal comprising the sequence of shaped symbols, as described in connection with the signal 311 of FIG. 3, the set of symbols (n) of FIGS. 4 and/or 5, and/or the set of symbols (n̂) of FIGS. 6 and/or 7. For example, 810 may be performed by a signal transmission component 944 of the apparatus 902 of FIG. 9.

At 812, the wireless transmitter may signal, to the receiver, information about bits to discard at the receiver based on a comparison of the first sequence of information bits and the second sequence of compressed information bits, as described in connection with the discard signal 430 of FIG. 4. For example, 812 may be performed by a discard component 946 of the apparatus 902 of FIG. 9.

In some examples, the first sequence of information bits may comprise a variable number of information bits, as described in connection with the first decompression procedure and the second decompression procedure of FIG. 6. In such examples, the first sequence of information bits may be a prefix subset (sometimes referred to as a "prefix code") of a fixed sequence of information bits. For example, the first sequence of information bits may correspond to the 20 information bits and the fixed sequence of information bits may correspond to the 100 information bits. For example, at 804, the wireless transmitter may stop decompressing the fixed sequence of information bits, as described in connection with the decompression component 602 of FIG. 6 and the nominal symbol block length (n'). For example, 804 may be performed by a stopping component 948 of the apparatus 902 of FIG. 9. For example, the wireless transmitter may apply Equation 8 (above) to stop decompressing the fixed sequence of information bits after generating the set of symbols (n̂).

At 814, the wireless transmitter may restart decompressing remaining information bits based on a variable determined from the second sequence of compressed information bits, as described in connection with the second decompression procedure of FIG. 6. For example, 814 may be performed by the decompression component 940 of the apparatus 902 of FIG. 9. For example, the wireless transmitter may restart decompressing the remaining information bits 81 to 100 of the sequence (u) of 100 information bits of FIG. 6.

In some examples, the sequence of shaped symbols transmitted to the received is based on a fixed sequence of information bits scaled by an integer number, as described in connection with Equations 9 and 10. In some examples, the integer number is based on a target entropy (H(s)) for the target PMF (p).

In some examples, at 808, the wireless transmitter may perform FEC encoding to the sequence of shaped symbols output based on the decompression of the first sequence of information bits, as described in connection with the FEC encoder 308 of FIG. 3. For example, 808 may be performed by an FEC encoding component 950 of the apparatus 902 of FIG. 9.

Figure 9:
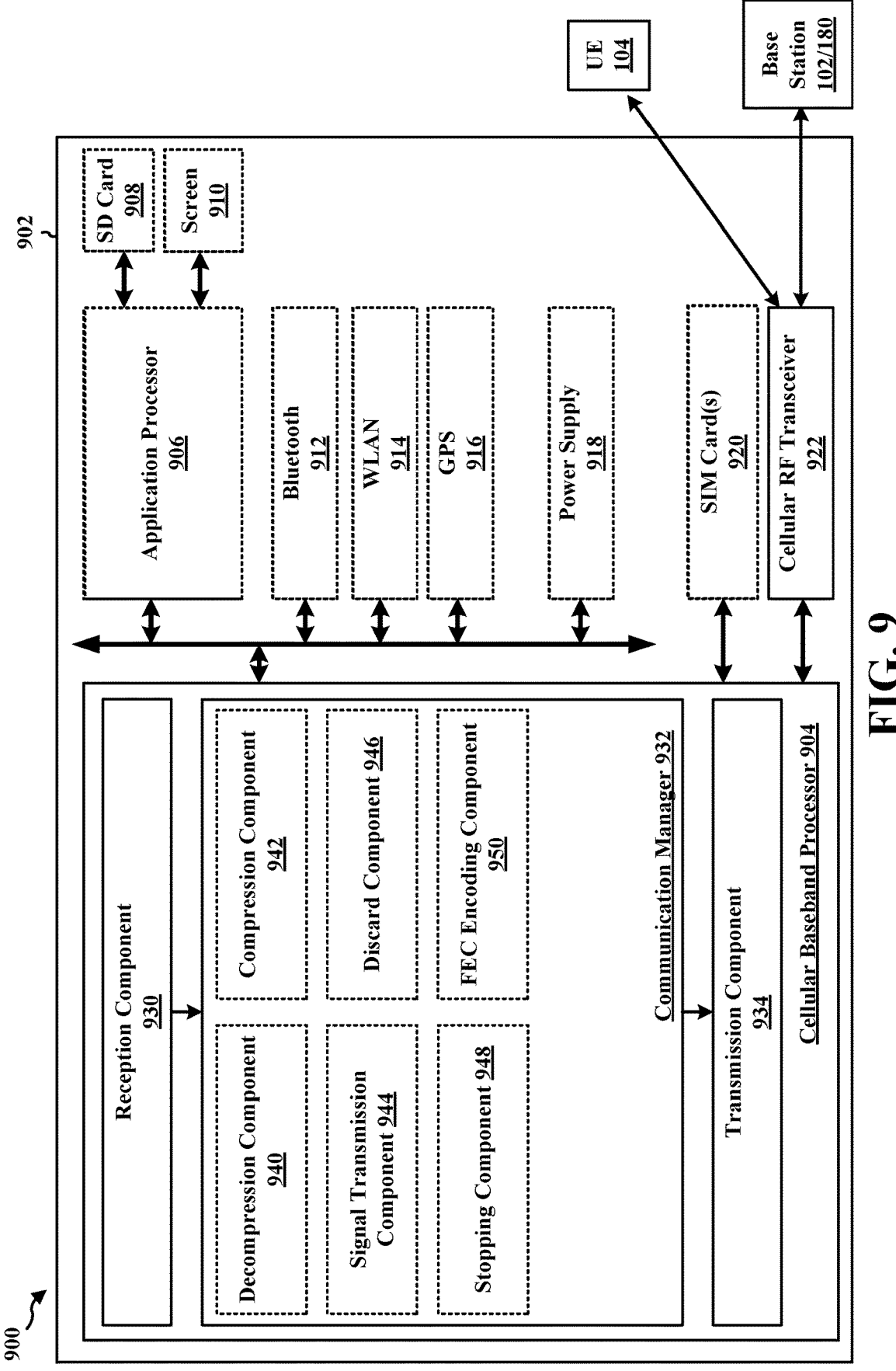
FIG. 9 is a diagram illustrating an example of a hardware implementation for an example apparatus, in accordance with the teachings disclosed herein.

FIG. 9 is a diagram 900 illustrating an example of a hardware implementation for an apparatus 902. The apparatus 902 is a wireless transmitter. and includes a cellular baseband processor 904 (also referred to as a modem) coupled to a cellular RF transceiver 922. In some aspects, the apparatus 902 may be a UE 104 or a base station 102 or 180. In some aspects, the apparatus may include additional components for wireless communication, including any combination of one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and/or a power supply 918. The cellular baseband processor 904 communicates through the cellular RF transceiver 922 with the UE 104 and/or base station 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 250 and may include the memory 260 and/or at least one of the TX processor 268, the RX processor 256, and the controller/processor 259. In one configuration, the apparatus 902 may be a modem chip and include just the cellular baseband processor 904, and in another configuration, the apparatus 902 may be the entire UE (e.g., see the UE 250 of FIG. 2) and include the additional modules of the apparatus 902. The cellular baseband processor 904 may be a component of the base station 210 and may include the memory 276 and/or at least one of the TX processor 216, the RX processor 270, and the controller/processor 275. In one configuration, the apparatus 902 may be a modem chip and include just the cellular baseband processor 904, and in another configuration, the apparatus 902 may be the entire base station (e.g., see the base station 210 of FIG. 2) and include the additional modules of the apparatus 902.

The communication manager 932 includes a decompression component 940 that is configured to decompress a first sequence of information bits for wireless transmission to output a sequence of shaped symbols, for example, as described in connection with 802 of FIG. 8. The example decompression component 940 may also be configured to restart decompressing remaining information bits based on a variable determined from the second sequence of compressed information bits, for example, as described in connection 814 of FIG. 8.

The communication manager 932 also includes a compression component 942 that is configured to compress the sequence of shaped symbols to output a second sequence of compressed information bits, for example, as described in connection with 804 of FIG. 8.

The communication manager 932 also includes a signal transmission component 944 that is configured to transmit, to a receiver, a signal comprising the sequence of shaped symbols, for example, as described in connection with 810 of FIG. 8.

The communication manager 932 also includes a discard component 946 that is configured to signal, to the receiver, information about bits to discard at the receiver based on a comparison of the first sequence of information bits and the second sequence of compressed information bits, for example, as described in connection with 812 of FIG. 8.

The communication manager 932 also includes a stopping component 948 that is configured to stop decompressing the fixed sequence of information bits, for example, as described in connection with 804 of FIG. 8.

The communication manager 932 also includes an FEC encoding component 950 that is configured to perform FEC encoding to the sequence of shaped symbols output based on the decompression of the first sequence of information bits, for example, as described in connection with 808 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for decompressing a first sequence of information bits for wireless transmission to output a sequence of shaped symbols. The example apparatus 902 also includes means for compressing the sequence of shaped symbols to output a second sequence of compressed information bits. The example apparatus 902 also includes means for transmitting, to a receiver, a signal comprising the sequence of shaped symbols.

In another configuration, the example apparatus 902 also includes means for signaling, to the receiver, information about postfix bits to discard at the receiver based on a comparison of the first sequence of information bits and the second sequence of compressed information bits.

In another configuration, the example apparatus 902 also includes means for stopping decompressing the fixed sequence of information bits. The example apparatus 902 also includes means for restarting decompressing remaining information bits based on a variable determined from the second sequence of compressed information bits.

In another configuration, the example apparatus 902 also includes means for performing FEC encoding to the sequence of shaped symbols output based on the decompressing of the first sequence of information bits.

The aforementioned means may be one or more of the aforementioned components of the apparatus 902 configured to perform the functions recited by the aforementioned means. As described supra, the apparatus 902 may include the TX processor 268, the RX processor 256, and the controller/processor 259. As such, in one configuration, the aforementioned means may be the TX processor 268, the RX processor 256, and the controller/processor 259 configured to perform the functions recited by the aforementioned means.

FIG. 10 is a flowchart 1000 of a method of wireless communication. The method may be performed by a wireless receiver, such as a UE (e.g., the UE 104, the UE 250, and/or an apparatus 1102 of FIG. 11) or a base station (e.g., the base station 102/180, the base station 210). Optional aspects are illustrated with a dashed line. The method may facilitate improving spectral efficiency by reducing rate loss due to shaping and improving the achievable information rate (e.g., improvement in gain) for communications in a noisy channel.

At 1002, the wireless receiver receives, from a transmitter, a signal comprising a sequence of shaped symbols, as described in connection with the signal 311 of FIG. 3, the set of symbols (n) of FIGS. 4 and/or 5, and/or the set of symbols (n̂) of FIGS. 6 and/or 7. For example, 1002 may be performed by a signal reception component 1140 of the apparatus 1102 of FIG. 11.

At 1004, the wireless receiver may receive, from the transmitter, information about bits to discard, as described in connection with the discard signal 430 of FIG. 4. For example, 1004 may be performed by a discard component 1144 of the apparatus 1102 of FIG. 11.

At 1006, the wireless receiver compresses the sequence of shaped symbols to output a sequence of compressed information bits, and where the compressing is based on the sequence of shaped symbols and a target probability mass function (PMF), as described in connection with the sequence (û) of k' compressed information bits of FIGS. 4 and/or 5, and/or the receiver bits of FIGS. 6 and/or 7. For example, 1006 may be performed by a compression component 1142 of the apparatus 1102 of FIG. 11.

In some examples, the sequence of shaped symbols comprises a variable number of information bits, as described in connection with the first decompression procedure and the second decompression procedure of FIG. 6. In such examples, the first sequence of information bits may be a prefix subset of a fixed sequence of information bits. For example, the first sequence of information bits may correspond to the 20 information bits and the fixed sequence of information bits may correspond to the 100 information bits. In some examples, the sequence of shaped symbols received at the wireless receiver is based on the fixed sequence of information bits scaled by an integer number, as described in connection with Equations 9 and 10. In some examples, the integer number is based on a target entropy (H(s)) for the target PMF (p).

In some examples, the compressing is based on arithmetic coding, as described in connection with FIGS. 5 and/or 7. In some examples, the compressing is based on one or more of Huffman coding, range coding, or universal coding. In some examples, the compressing is based on probabilistic compression. In some examples, the compressing of the sequence of shaped symbols is performed at a distribution demarche, such as the example fixed-to-fixed receiver distribution dematcher 450 of FIG. 4, the example fixed-to-fixed receiver distribution dematcher 550 of FIG. 5, the example variable-to-fixed receiver distribution dematcher 650 of FIG. 6, and/or the example variable-to-fixed receiver distribution dematcher 750 of FIG. 7.

In some examples, the sequence of shaped symbols comprises shaped positive amplitude symbols.

In some examples, at 1008, the wireless receiver may perform FEC decoding of the sequence of shaped symbols output prior to the compressing, as described in connection with the FEC decoder 316 of FIG. 3. For example, 1008 may be performed by an FEC decoding component 1146 of the apparatus 1102 of FIG. 11.

Figure 11:
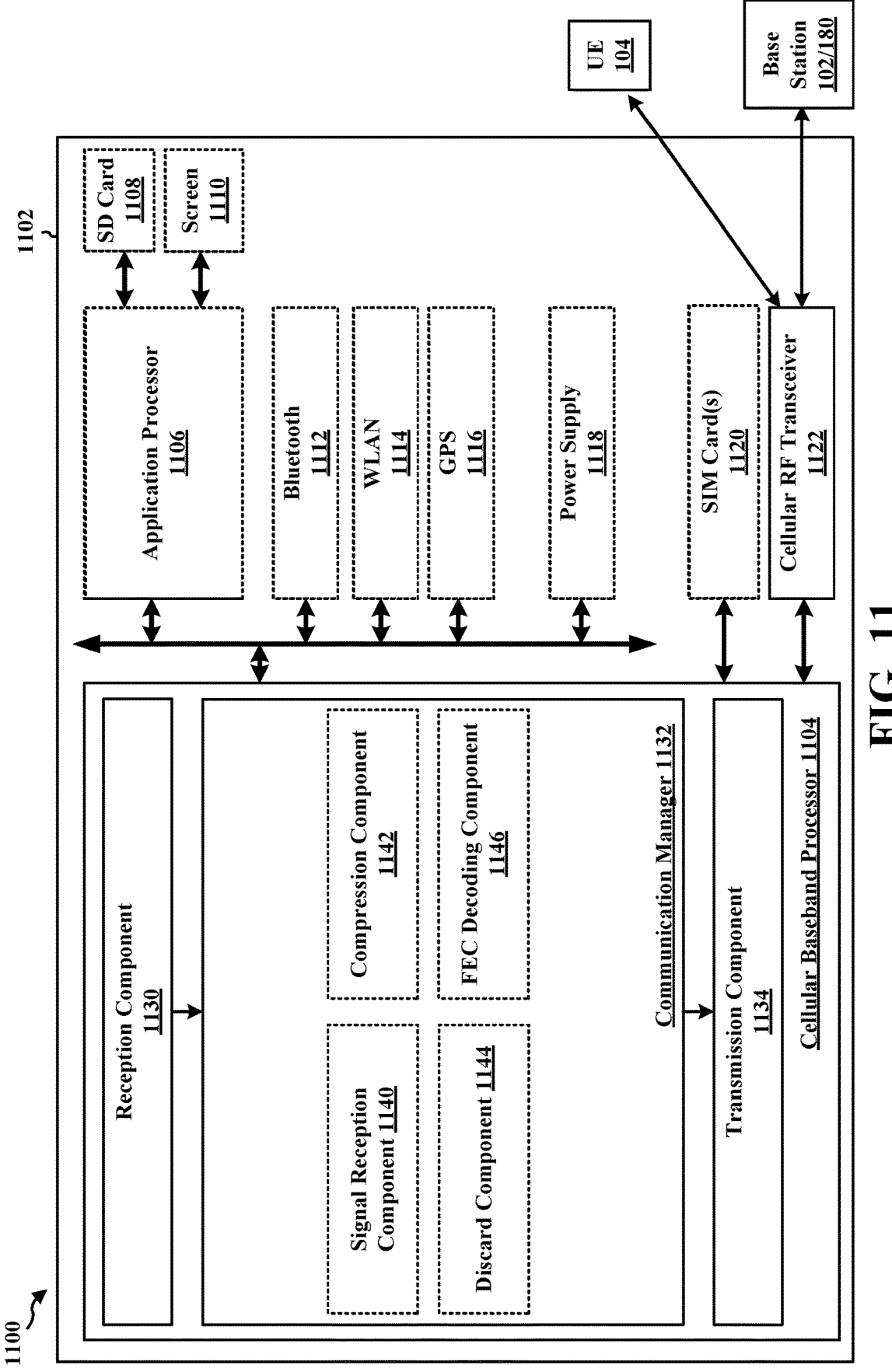
FIG. 11 is a diagram illustrating an example of a hardware implementation for an example apparatus, in accordance with the teachings disclosed herein.

FIG. 11 is a diagram 1100 illustrating an example of a hardware implementation for an apparatus 1102. The apparatus 1102 is a wireless receiver and includes a cellular baseband processor 1104 (also referred to as a modem) coupled to a cellular RF transceiver 1122. In some aspects, the apparatus 1102 may be a UE 104 or a base station 102 or 180. In some aspects, the apparatus may include additional components for wireless communication, including any combination of one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or base station 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 250 and may include the memory 260 and/or at least one of the TX processor 268, the RX processor 256, and the controller/processor 259. In one configuration, the apparatus 1102 may be a modem chip and include just the cellular baseband processor 1104, and in another configuration, the apparatus 1102 may be the entire UE (e.g., see the UE 250 of FIG. 2) and include the additional modules of the apparatus 1102. The cellular baseband processor 1104 may be a component of the base station 210 and may include the memory 276 and/or at least one of the TX processor 216, the RX processor 270, and the controller/processor 275. In one configuration, the apparatus 1102 may be a modem chip and include just the cellular baseband processor 1104, and in another configuration, the apparatus 1102 may be the entire base station (e.g., see the base station 210 of FIG. 2) and include the additional modules of the apparatus 1102.

The communication manager 1132 includes a signal reception component 1140 that is configured to receive, from a transmitter, a signal comprising a sequence of shaped symbols, for example, as described in connection with 1002 of FIG. 10.

The communication manager 1132 also includes a compression component 1142 that is configured to compress the sequence of shaped symbols to output a sequence of compressed information bits, and where the compressing is based on the sequence of shaped symbols and a target probability mass function (PMF), for example, as described in connection with 1004 of FIG. 10.

The communication manager 1132 also includes a discard component 1144 that is configured to receive, from the transmitter, information about bits to discard, for example, as described in connection with 1006 of FIG. 10.

The communication manager 1132 also includes an FEC decoding component 1146 that is configured to perform FEC decoding of the sequence of shaped symbols output prior to the compressing, for example, as described in connection with 1008 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving, from a transmitter, a signal comprising a sequence of shaped symbols. The example apparatus 1102 also includes means for compressing the sequence of shaped symbols to output a sequence of compressed information bits, wherein the compressing is based on the sequence of shaped symbols and a target PMF.

In another configuration, the example apparatus 1102 also includes means for receiving, from the transmitter, information about postfix bits to discard.

In another configuration, the example apparatus 1102 also includes means for performing FEC decoding of the sequence of shaped symbols output prior to the compressing.

The aforementioned means may be one or more of the aforementioned components of the apparatus 1102 configured to perform the functions recited by the aforementioned means. As described supra, the apparatus 1102 may include the TX processor 216, the RX processor 270, and the controller/processor 275. As such, in one configuration, the aforementioned means may be the TX processor 216, the RX processor 270, and the controller/processor 275 configured to perform the functions recited by the aforementioned means.

FIG. 12A is a diagram 1200 illustrating an example of a first subframe within a 5G NR frame structure. FIG. 12B is a diagram 1230 illustrating an example of DL channels within a 5G NR subframe. FIG. 12C is a diagram 1250 illustrating an example of a second subframe within a 5G NR frame structure. FIG. 12D is a diagram 1280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 12A, 12C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 12A-12D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 12B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 12A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 12B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 12C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 12D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Aspects disclosed herein provide techniques for improving the spectral efficiency and achievable information rate for communication over a channel, e.g., an AWGN channel. For example, disclosed techniques utilize a distribution matcher that includes a decompresser to convert a sequence of information bits into a set of symbols. The sequence of information bits may be uniformly distributed, such as in 5G NR. The decompresser may generate the sequence of symbols based on a target probability mass function (PMF), such as a Maxwell-Boltzmann Distribution, and a symbol block length. The sequence of symbols may be transmitted to a receiver for processing to determine the transmitted information.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a wireless transmitter, comprising: decompressing a first sequence of information bits for wireless transmission to output a sequence of shaped symbols; compressing the sequence of shaped symbols to output a second sequence of compressed information bits; and transmitting, to a receiver, a signal comprising the sequence of shaped symbols.

Aspect 2 is the method of aspect 1, further including that the decompressing is based on a target symbol length and a target PMF and the compressing is based on the target PMF.

Aspect 3 is the method of any of aspect 1 or aspect 2, further including that the first sequence of information bits comprises a fixed sequence of information bits, the method further comprising: signaling, to the receiver, information about postfix bits to discard at the receiver based on a comparison of the first sequence of information bits and the second sequence of compressed information bits.

Aspect 4 is the method of any of aspects 1 to 2, further including that the first sequence of information bits comprises a variable number of information bits.

Aspect 5 is the method of any of aspects 1 to 4, further including that the first sequence of information bits is a prefix subset of a fixed sequence of information bits.

Aspect 6 is the method of any of aspects 1 to 5, further including: stopping decompressing the fixed sequence of information bits; and restarting decompressing remaining information bits based on a variable determined from the second sequence of compressed information bits.

Aspect 7 is the method of any of aspects 1 to 6, further including that the sequence of shaped symbols transmitted to the receiver is based on the fixed sequence of information bits scaled by an integer number.

Aspect 8 is the method of any of aspects 1 to 7, further including that the integer number is based on a target entropy for the target PMF.

Aspect 9 is the method of any of aspects 1 to 8, further including that the decompressing is based on arithmetic decoding and the compressing is based on arithmetic coding.

Aspect 10 is the method of any of aspects 1 to 8, further including that the decompressing is based one or more of Huffman coding, range coding, or universal coding.

Aspect 11 is the method of any of aspects 1 to 8, further including that the decompressing is based on probabilistic decompression and the compressing is based on probabilistic compression.

Aspect 12 is the method of any of aspects 1 to 11, further including that the decompressing of the first sequence of information bits is performed at a distribution matcher.

Aspect 13 is the method of any of aspects 1 to 12, further including that the sequence of shaped symbols comprises shaped positive amplitude symbols.

Aspect 14 is the method of any of aspects 1 to 13, further including: performing FEC encoding to the sequence of shaped symbols output based on the decompressing of the first sequence of information bits.

Aspect 15 is an apparatus for wireless communication including a memory and at least one processor coupled to a memory, the memory and the at least one processor configured to implement a method as in any of aspects 1 to 14.

Aspect 16 is an apparatus for wireless communication including means for implementing a method as in any of aspects 1 to 14.

Aspect 17 is a non-transitory computer-readable storage medium storing computer executable code, where the code, when executed, causes a processor to implement a method as in any of aspects 1 to 14.

Aspect 18 is a method of wireless communication at a wireless receiver, comprising: receiving, from a transmitter, a signal comprising a sequence of shaped symbols; and compressing the sequence of shaped symbols to output a sequence of compressed information bits, wherein the compressing is based on the sequence of shaped symbols and a target PMF.

Aspect 19 is the method of aspect 18, further including that the sequence of shaped symbols is based on a fixed sequence of information bits, the method further comprising: receiving, from the transmitter, information about bits to discard.

Aspect 20 is the method of aspect 18, further including that the sequence of shaped symbols comprises a variable number of information bits.

Aspect 21 is the method of any of aspects 18 to 20, further including that the variable number of information bits is a prefix subset of a fixed sequence of information bits.

Aspect 22 is the method of any of aspects 18 to 21, further including that the sequence of shaped symbols received at the wireless receiver is based on the fixed sequence of information bits scaled by an integer number.

Aspect 23 is the method of any of aspects 18 to 22, further including that the integer number is based on a target entropy for the target PMF.

Aspect 24 is the method of any of aspects 18 to 23, further including that the compressing is based on arithmetic coding.

Aspect 25 is the method of any of aspects 18 to 23, further including that the compressing is based one or more of Huffman coding, range coding, or universal coding.

Aspect 26 is the method of any of aspects 18 to 23, further including that the compressing is based on probabilistic compression.

Aspect 27 is the method of any of aspects 18 to 26, further including that the compressing of the sequence of shaped symbols is performed at a distribution dematcher.

Aspect 28 is the method of any of aspects 18 to 27, further including that the sequence of shaped symbols comprises shaped positive amplitude symbols.

Aspect 29 is the method of any of aspects 18 to 28, further including: performing FEC decoding of the sequence of shaped symbols output prior to the compressing.

Aspect 30 is an apparatus for wireless communication including a memory and at least one processor coupled to a memory, the memory and the at least one processor configured to implement a method as in any of aspects 18 to 29.

Aspect 31 is an apparatus for wireless communication including means for implementing a method as in any of aspects 18 to 29.

Aspect 32 is a non-transitory computer-readable storage medium storing computer executable code, where the code, when executed, causes a processor to implement a method as in any of aspects 18 to 29.

What is claimed is:

1. An apparatus for wireless communication at a wireless transmitter, comprising:
   memory; and
   at least one processor coupled to the memory, the at least one processor configured to:
      decompress a first sequence of information bits for wireless transmission to output a sequence of shaped symbols;
      compress the sequence of shaped symbols to output a second sequence of compressed information bits; and
      transmit, to a receiver, a signal comprising the sequence of shaped symbols.

2. The apparatus of claim 1, wherein the decompression is based on a target symbol length and a target probability mass function (PMF) and the compression is based on the target PMF.

3. The apparatus of claim 2, wherein the first sequence of information bits comprises a fixed sequence of information bits, and wherein the at least one processor is further configured to:
   signal, to the receiver, information about postfix bits to discard at the receiver based on a comparison of the first sequence of information bits and the second sequence of compressed information bits.

4. The apparatus of claim 2, wherein the first sequence of information bits comprises a variable number of information bits.

5. The apparatus of claim 4, wherein the first sequence of information bits is a prefix subset of a fixed sequence of information bits.

6. The apparatus of claim 5, wherein the at least one processor is further configured to:
   stop the decompression of the fixed sequence of information bits; and restart decompression of remaining information bits based on a variable determined from the second sequence of compressed information bits.

7. The apparatus of claim 5, wherein the sequence of shaped symbols transmitted to the receiver is based on the fixed sequence of information bits scaled by an integer number.

8. The apparatus of claim 7, wherein the integer number is based on a target entropy for the target PMF.

9. The apparatus of claim 2, wherein the decompression is based on arithmetic decoding and the compression is based on arithmetic coding.

10. The apparatus of claim 2, wherein the decompression is based one or more of Huffman coding, range coding, or universal coding.

11. The apparatus of claim 2, wherein the decompression is based on probabilistic decompression and the compression is based on probabilistic compression.

12. The apparatus of claim 2, wherein the decompression of the first sequence of information bits is performed at a distribution matcher.

13. The apparatus of claim 2, wherein the sequence of shaped symbols comprises shaped positive amplitude symbols.

14. The apparatus of claim 2, wherein the at least one processor is further configured to:

perform forward error correction (FEC) encoding to the sequence of shaped symbols output based on the decompression of the first sequence of information bits.

15. A method of wireless communication at a wireless transmitter, comprising:

decompressing a first sequence of information bits for wireless transmission to output a sequence of shaped symbols;

compressing the sequence of shaped symbols to output a second sequence of compressed information bits; and transmitting, to a receiver, a signal comprising the sequence of shaped symbols.

16. The method of claim 15, wherein the decompressing is based on a target symbol length and a target probability mass function (PMF), the compressing is based on the target PMF, the first sequence of information bits comprises a fixed sequence of information bits, and the method further comprises:

signaling, to the receiver, information about postfix bits to discard at the receiver based on a comparison of the first sequence of information bits and the second sequence of compressed information bits.

17. The method of claim 15, wherein the decompressing is based on a target symbol length and a target probability mass function (PMF), the compressing is based on the target PMF, the first sequence of information bits comprises a variable number of information bits, the first sequence of information bits is a prefix subset of a fixed sequence of information bits, and the method further comprises:

stopping the decompression of the fixed sequence of information bits; and restarting decompression of remaining information bits based on a variable determined from the second sequence of compressed information bits.

18. An apparatus for wireless communication at a wireless receiver, comprising:

memory; and at least one processor coupled to the memory, the at least one processor configured to:

receive, from a transmitter, a signal comprising a sequence of shaped symbols generated based on a target probability mass function (PMF); and compress the sequence of shaped symbols to output a sequence of compressed information bits, wherein the compression is based on the sequence of shaped symbols and the target PMF.

19. The apparatus of claim 18, wherein the sequence of shaped symbols is based on a fixed sequence of information bits, and wherein the at least one processor is further configured to:

receive, from the transmitter, information about postfix bits to discard.

20. The apparatus of claim 18, wherein the sequence of shaped symbols comprises a variable number of information bits.

21. The apparatus of claim 20, wherein the variable number of information bits is a prefix subset of a fixed sequence of information bits.

22. The apparatus of claim 21, wherein the sequence of shaped symbols received at the wireless receiver is based on the fixed sequence of information bits scaled by an integer number.

23. The apparatus of claim 22, wherein the integer number is based on a target entropy for the target PMF.

24. The apparatus of claim 18, wherein the compression is based on arithmetic coding.

25. The apparatus of claim 18, wherein the compression is based one or more of Huffman coding, range coding, or universal coding.

26. The apparatus of claim 18, wherein the compression is based on probabilistic compression.

27. The apparatus of claim 18, wherein the compression of the sequence of shaped symbols is performed at a distribution dematcher.

28. The apparatus of claim 18, wherein the sequence of shaped symbols comprises shaped positive amplitude symbols.

29. The apparatus of claim 18, wherein the at least one processor is further configured to:

perform forward error correction (FEC) decoding of the sequence of shaped symbols output prior to the compression.

30. A method of wireless communication at a wireless receiver, comprising:

receiving, from a transmitter, a signal comprising a sequence of shaped symbols generated based on a target probability mass function (PMF); and compressing the sequence of shaped symbols to output a sequence of compressed information bits, wherein the compressing is based on the sequence of shaped symbols and the target PMF.

*    *    *    *    *